US007302488B2

(12) United States Patent
Mathew et al.

(10) Patent No.: US 7,302,488 B2
(45) Date of Patent: Nov. 27, 2007

(54) PARENTAL CONTROLS CUSTOMIZATION AND NOTIFICATION

(75) Inventors: Ashvin J. Mathew, Kirkland, WA (US); Craig A. Beilinson, Bellevue, WA (US); Christopher A. Evans, Sammamish, WA (US); Harry J. W. Fravert, Redmond, WA (US); Ahmad H. Safa, Sammamish, WA (US); Linda I. Hong, Bellevue, WA (US); Victor Tan, Kirkland, WA (US); Laurel S. Abbott, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 10/187,408

(22) Filed: Jun. 28, 2002

(65) Prior Publication Data

US 2004/0003071 A1 Jan. 1, 2004

(51) Int. Cl.
  G06F 15/16 (2006.01)
  G06F 7/04 (2006.01)
  G06F 15/173 (2006.01)
(52) U.S. Cl. .............................. 709/229; 726/1; 726/4
(58) Field of Classification Search ................ 709/223, 709/224, 225, 229; 726/1–4, 16, 17
  See application file for complete search history.

(56) References Cited

U.S. PATENT DOCUMENTS

| | | | | |
|---|---|---|---|---|
| 5,440,624 A | * | 8/1995 | Schoof, II | 379/202.01 |
| 5,729,734 A | * | 3/1998 | Parker et al. | 707/9 |
| 5,806,043 A | * | 9/1998 | Toader | 405/14 |
| 5,889,958 A | * | 3/1999 | Willens | 709/229 |
| 6,158,008 A | | 12/2000 | Maria et al. | |
| 6,366,925 B1 | * | 4/2002 | Meltzer et al. | 705/6 |
| 6,505,201 B1 | * | 1/2003 | Haitsuka et al. | 707/10 |
| 6,560,611 B1 | * | 5/2003 | Nine et al. | 717/104.1 |
| 6,564,327 B1 | * | 5/2003 | Klensin et al. | 726/7 |
| 6,742,030 B1 | * | 5/2004 | MacPhail | 709/224 |
| 6,745,367 B1 | * | 6/2004 | Bates et al. | 715/500 |

(Continued)

FOREIGN PATENT DOCUMENTS

DE    100 24 234 A    11/2001

(Continued)

OTHER PUBLICATIONS

"W@P Service Indication," WAP-167-ServiceInd-20010731-a, Version 31, Wireless Application Protocol Forum, Ltd., Jul. 2001, pp. 1-27.

(Continued)

Primary Examiner—Andrew Caldwell
Assistant Examiner—Douglas Blair
(74) Attorney, Agent, or Firm—Christensen O'Connor Johnson Kindness PLLC

(57) ABSTRACT

A method, system, and computer readable medium are provided for enabling a user and an administrator in a network environment to interactively customize administrator controls used to filter the user's online actions. The computer receives a user request to perform a blocked online action. The computer provides information about the pending request to the administrator and receives request resolution information from the administrator. The computer updates the administrator controls used to filter the user's online actions in accordance with the request resolution information.

70 Claims, 21 Drawing Sheets

U.S. PATENT DOCUMENTS

| | | | |
|---|---|---|---|
| 6,795,856 B1* | 9/2004 | Bunch | 709/224 |
| 6,970,842 B1* | 11/2005 | Ashby | 705/38 |
| 7,031,954 B1* | 4/2006 | Kirsch | 707/3 |
| 7,032,007 B2* | 4/2006 | Fellenstein et al. | 709/206 |
| 7,039,945 B2* | 5/2006 | Vinati et al. | 726/2 |
| 7,062,465 B1* | 6/2006 | Shafiee et al. | 705/50 |
| 7,069,437 B2* | 6/2006 | Williams | 713/166 |
| 7,089,246 B1* | 8/2006 | O'Laughlen | 707/10 |
| 7,181,513 B1* | 2/2007 | Harada et al. | 709/223 |
| 7,203,656 B2* | 4/2007 | Lotvin et al. | 705/13 |
| 2001/0047485 A1* | 11/2001 | Brown et al. | 713/201 |
| 2002/0120866 A1* | 8/2002 | Mitchell et al. | 713/201 |
| 2002/0184534 A1* | 12/2002 | Rangan et al. | 713/201 |
| 2002/0194502 A1* | 12/2002 | Sheth et al. | 713/201 |
| 2004/0003079 A1* | 1/2004 | Aiu et al. | 709/225 |

FOREIGN PATENT DOCUMENTS

| | | |
|---|---|---|
| WO | WO 98/40992 A2 | 9/1998 |
| WO | WO 00/67096 A2 | 11/2000 |
| WO | WO 02/14989 A2 | 2/2002 |

OTHER PUBLICATIONS

Kresken T., "Wberblick Push-Technologie," *Architektur vernetzer Systeme—Seminar SS 1997 und WS 1997/98*, Universtät Karlsruhe; Institut für Telematik, 1998, pp. 29-46.

* cited by examiner

PARENTAL CONTROLS CUSTOMIZATION AND NOTIFICATION

FIELD OF THE INVENTION

This invention is generally related to the field of computer software and more specifically to a method and system for controlling access across a network.

BACKGROUND OF THE INVENTION

While the Internet can provide a tremendous amount of information about a wide variety of subjects, the Internet can also pose dangers, especially for children. Parents want their children to have access to the many educational resources that can be found on the Internet. At the same time, parents want to prevent their children from accessing the many Web sites that contain violence, pornography, and other material inappropriate for children. Even more so, parents want to protect their children from child predators that use the Internet to lure children from chat rooms to in-person meetings.

In 1998, the Children's Online Privacy Protection Act ("COPPA") was passed to prohibit Web sites from gathering personal information from children under the age of 13 without parental consent. While COPPA is a significant and positive step toward protecting children's privacy when on the Internet, there are many other dangers on the Internet that COPPA fails to address. COPPA does not protect children from viewing inappropriate material on Web sites. COPPA also does not protect children from communicating with strangers that could be child predators on the Internet.

Conventional computer technology provides a few steps that parents can take to protect their children from material and individuals that may be harmful. One type of conventional computer technology for protecting children is blocking software that blocks access to certain sites that have been predetermined as inappropriate or which contain key words, such as profanity or sex-related words. Blocking software comes in different forms, such as stand-alone software packages, resources on the Internet, and as an online service that allows parents to limit access to certain sites and features, such as e-mail, instant messages, or certain content. Popular online services are provided by Internet service providers such as MSN the Microsoft Network® provided by Microsoft Corporation of Redmond, Wash. In order to determine which sites and content are most appropriate for children, child-specific search engines, ratings, and review sites have been emerging. Search engines and directories yield only those sites that have been determined appropriate for children. Of course, such search engines and blocking software do not automatically protect children from all inappropriate content.

While conventional computer technology can aid parents in controlling the content their child can access on the Internet, the conventional computer technology is not perfect. The blocking software or online services often miss inappropriate sites and block appropriate sites. It would be advantageous for parents and children to communicate about the online controls and to enable parents to customize the online controls for children based on those communications. Therefore, there exists a need for children and parents to communicate regarding the parental controls, with the ability for parents to customize the parental controls based on that communication.

SUMMARY OF THE INVENTION

The present invention satisfies the aforementioned needs by providing a method and system for parental controls customization and notification. Generally described, the parental controls customization and notification method and system enable a user (e.g., a child) and an administrator in a network environment (e.g., a parent) to interactively customize the administrator controls used to filter the user's online actions. Controls are the filter settings employed to control the actions of the users.

One aspect of the present invention provides a computer-implementable method for enabling a user and an administrator in a network environment to interactively customize administrator controls used to filter the user's online actions. The computer receives a user request for consent to perform a blocked online action. The computer provides information about the pending request to an administrator and receives request resolution information from the administrator. The computer updates the administrator controls used to filter a user's online actions with the request resolution information.

Another aspect of the present invention provides a computer-implementable method for enabling a user and an administrator in a network environment to interactively customize administrator controls used to filter the user's online actions. When the computer receives a request from a user for consent to perform a blocked online action, the computer determines if an administrator is present and, if an administrator is present, receives the administrator's identification. In response to receiving the administrator's identification, the computer authenticates the administrator without denying the user's access to the network environment. After authenticating the administrator, the computer presents the user's request to the administrator and determines if the administrator accepts the user's request. If the administrator accepts the user's request, the computer updates the administrator controls for the user to allow the previously blocked action.

Yet another aspect of the present invention provides a computer-implementable method for enabling a user and an administrator in a network to interactively customize administrator controls used to filter the user's online actions. The computer tracks and stores the user's allowed and blocked online actions. The computer generates a history summary report from the stored information and provides the history summary report to the administrator. If the computer receives an administrator request to block the user from performing an action indicated as being allowed in the history summary report, the computer updates the administrator controls used to filter a user's online actions to include blocking the action.

An additional aspect of the present invention provides a computer-readable medium having computer-executable instructions for enabling a user and an administrator in a network environment to interactively customize the administrator controls used to filter the user's online actions. When executed, the instructions cause the computer to respond to a user request to perform a blocked online action by providing information about the pending request to an administrator. In response to the computer receiving request resolution information from the administrator, the computer updates the administrator controls used to filter a user's online actions with the request resolution information.

Another aspect of the present invention provides a computer-readable medium having computer-executable instructions for enabling a user and an administrator in a network environment to interactively customize administrator controls used to filter the user's online actions. When executed the instructions cause the computer to respond to receiving a request from the user to perform a blocked online action by determining if the administrator is present. If the administrator is present, the computer responds to receiving the administrator's identification by authenticating the administrator without denying the user's access to the network environment. After authenticating the administrator, the computer presents the user's request to the administrator and determines if the administrator accepts the user's request. If the administrator accepts the user's request, the computer updates the administrator controls for the user to allow the previously blocked action.

A further aspect of the present invention provides a computer-readable medium having computer-executable instructions for enabling a user and an administrator in a network environment to interactively customize administrator controls used to filter the user's online actions. When executed, the instructions perform a process that includes tracking and storing the user's allowed and blocked online actions. The process includes generating a history summary report for the user by generating a history summary report from the stored information and providing the history summary report to the administrator. In response to the computer receiving an administrator request to block the user from performing an action indicated as being allowed in the history summary report, the process includes updating the administrator controls used to filter a user's online actions to include blocking the action.

A further aspect of the present invention provides a computer-readable medium having a data structure stored thereon for use in enabling a user and an administrator in a network environment to interactively customize administrator controls used to filter the user's online actions. The preferred form of the data structure includes a data element indicative of request identification information, a data element indicative of user identification information, a data element indicative of administrator identification information, a data element indicative of information about blocked online action, and a data element indicative of request status information. The data structure is used to create an entry in a consent database for a request to modify the administrator controls used to filter a user's online actions.

Another aspect of the present invention provides a computer system for enabling a user and an administrator in a network environment to interactively customize administrator controls used to filter a user's online actions. The computer system includes a setting database component for storing information about the administrator controls used to filter a user's online actions and an administrator control component. Preferably, the administrator control component is operable to receive a user request to perform a blocked online action, provide information about the pending request to an administrator, receive request resolution information from the administrator, and update the administrator controls for the user in the setting database with the request resolution information.

Another aspect of the present invention provides a computer system for enabling a user and an administrator in a network environment to interactively customize administrator controls used to filter the user's online actions. The computer system includes a setting database component for storing information about the administrators controls used to filter the user's online actions and an administrator control component. Preferably, the administrator control component is operable to receive a request from a user to perform a blocked online action, determine if an administrator is present and, if an administrator is present, receiving the administrator's identification. In response to receiving the administrator's identification, the administrator control component authenticates the administrator without denying the user's access to the network environment. After authenticating the administrator, the administrator control component presents the user's request to the administrator and determines if the administrator accepts the user's request. If the administrator accepts the user's request, the administrator controls for the user are updated to allow the previously blocked action.

Another aspect of the present invention provides a computer system for enabling a user and an administrator in a network environment to interactively customize administrator controls used to filter the user's online actions. The computer system includes a setting database component for storing information about the administrators controls being used to filter the user's online actions and an administrator control component. Preferably, the administrator control component is operable to track and store the user's allowed and blocked online actions, generate a history summary report from the stored information, and provide the history summary report to the administrator. In response to receiving an administrator request to block the user from performing a first action indicated as being allowed in the history summary report, the administrative control component updates the administrator controls for the user to include blocking the first action.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 6:
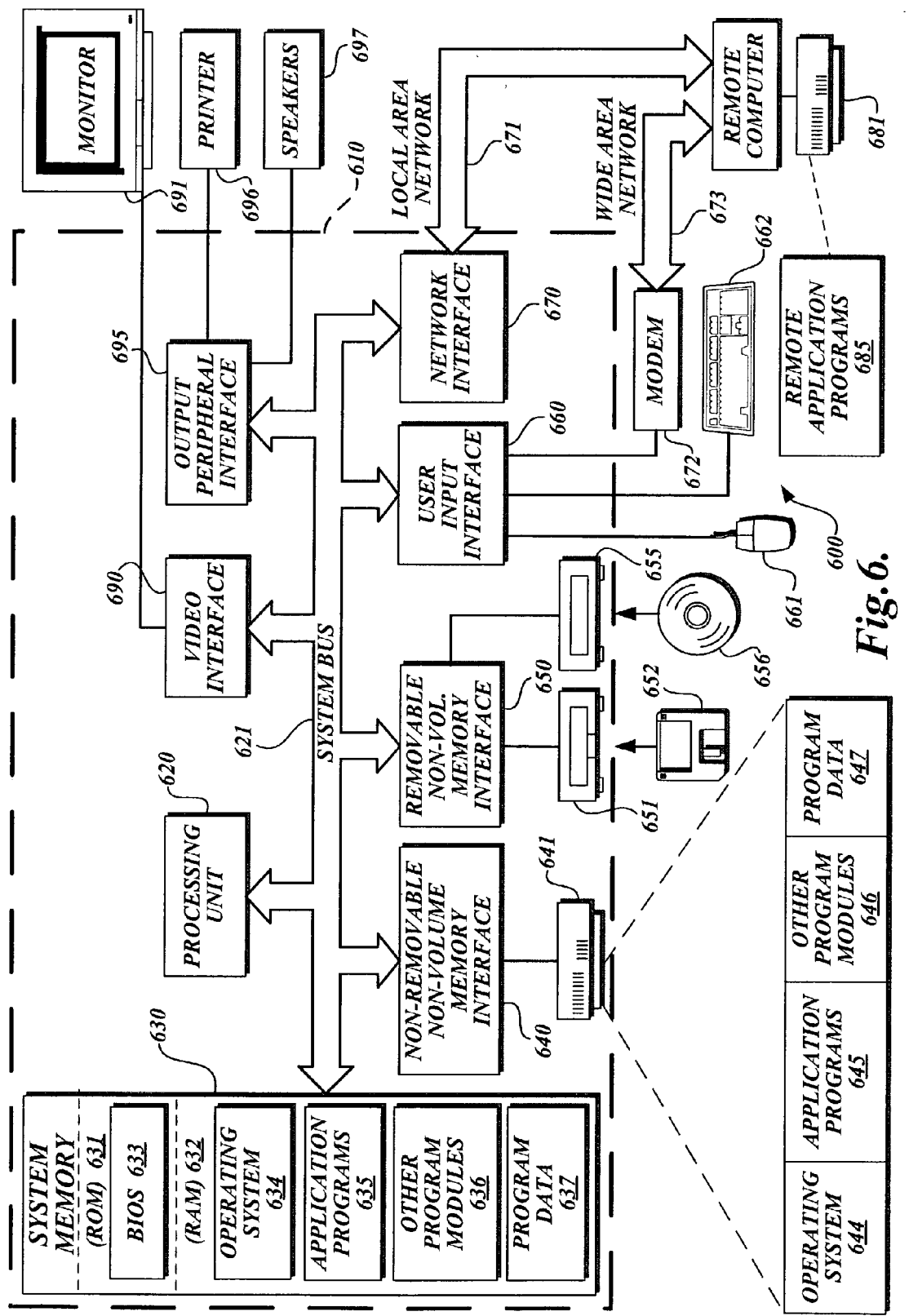
FIG. 6 is a block diagram showing an illustrative operating environment for one exemplary embodiment of the present invention.

As briefly described above, the present invention provides methods, systems, and computer readable media for customizing parental controls. FIG. 6 illustrates a representative operating environment, namely, a personal computer, in which the invention is useful. The illustrated computing system environment is only one example of an operating environment in which the invention finds use and is not intended to suggest any limitation as to the scope of use or functionality of the invention. Neither should the computing environment be interpreted as having any dependency requirement relating to any one or combination of components illustrated in the exemplary operating environment.

The invention is implementable in numerous other general purposes or special computing environments or configurations. Examples of well-known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems, or the like.

The many components of a personal computer system 600 that a client and server computer may consist of are illustrated in FIG. 6 as a computer 610, which may include, but is not limited to, a processing unit 620, a system memory 630, and a system bus 621 that couples various system components, including the system memory, to the processing unit 620. The system bus 621 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus. Computer 610 typically includes a variety of computer-readable media. Computer-readable media can be any available media that can be accessed by computer 610 and include both volatile and nonvolatile media and removable and nonremovable media. By way of example, and not limitation, computer-readable media may comprise computer storage media and communication media. Computer storage media include both volatile and nonvolatile and removable and nonremovable media implemented in any method or technology for storage and information, such as computer-readable instructions, data structures, program modules, or other data. Computer storage media include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium that can be used to store the desired information and that can be assessed by computer 610. Communication media typically embody computer-readable instructions, data structures, program modules, or other data in the modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

The system memory 630 includes computer storage media in the form of volatile and/or nonvolatile memory, such as read-only memory (ROM) 631 and random-access memory (RAM) 632. A basic input/output system 633 (BIOS) contains basic routines that help to transfer information between elements within the computer 610, such as program modules that are immediately accessible to and/or presently being operated on by processing unit 620. By way of example, and not limitation, FIG. 6 illustrates as operating system 634, application programs 635, other program modules 636, and program data 637.

The computer 610 may also include other removable/nonremovable, volatile/nonvolatile computer storage media. By way of example only, FIG. 6 illustrates a hard disk drive 641 that reads from or writes to nonremovable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as CD-ROM or other optical media. Other removable/nonremovable, volatile/nonvolatile computer storage media that can be used in the exemplary operating environment include, but are not limited to, magnetic tape cassettes, flash memory cards, digital versatile disk, digital videotape, solid state RAM, solid state ROM, and the like. The hard disk drive 641 is typically connected to the system bus 621 through a non-removable memory interface, such as interface 640, and magnetic disk drive 651 and optical disk drive 655 are typically connected to the system bus 621 by a removable memory interface, such as interface 650.

The drives and their associated computer storage media, discussed above and illustrated in FIG. 6, provide storage of computer-readable instructions, data structures, program modules, and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information to the computer through input devices such as a keyboard 662 and pointing device 661, commonly referred to as a mouse, trackball, or touch pad. Other input devices (not shown) may include a microphone, joystick, game pad, satellite dish, scanner, or the like. These and other input devices are often connected to the processing unit 620 through a user-input interface 660 that is coupled to the system bus, but may be connected by other interface and bus structures, such as a parallel port, game port, or universal serial bus (USB). A monitor 691 or other type of display device is also connected to the system bus 621 via an interface, such as a video interface 690. In addition to the monitor, computers may also include other peripheral output devices, such as speakers 697 and printer 696, which may be connected through an output peripheral interface 695.

As discussed earlier, one embodiment of the present invention operates in a networked environment using logical connections to one or more remote computers, such as a remote computer. The remote computer may be a personal computer, a server, a router, a network PC, a peer device, or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets, and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user-input interface 660 or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory storage device 681. It will be appreciated that the network connections shown are exemplary, and other means of establishing a communication link between the computers may be used.

Figure 1:
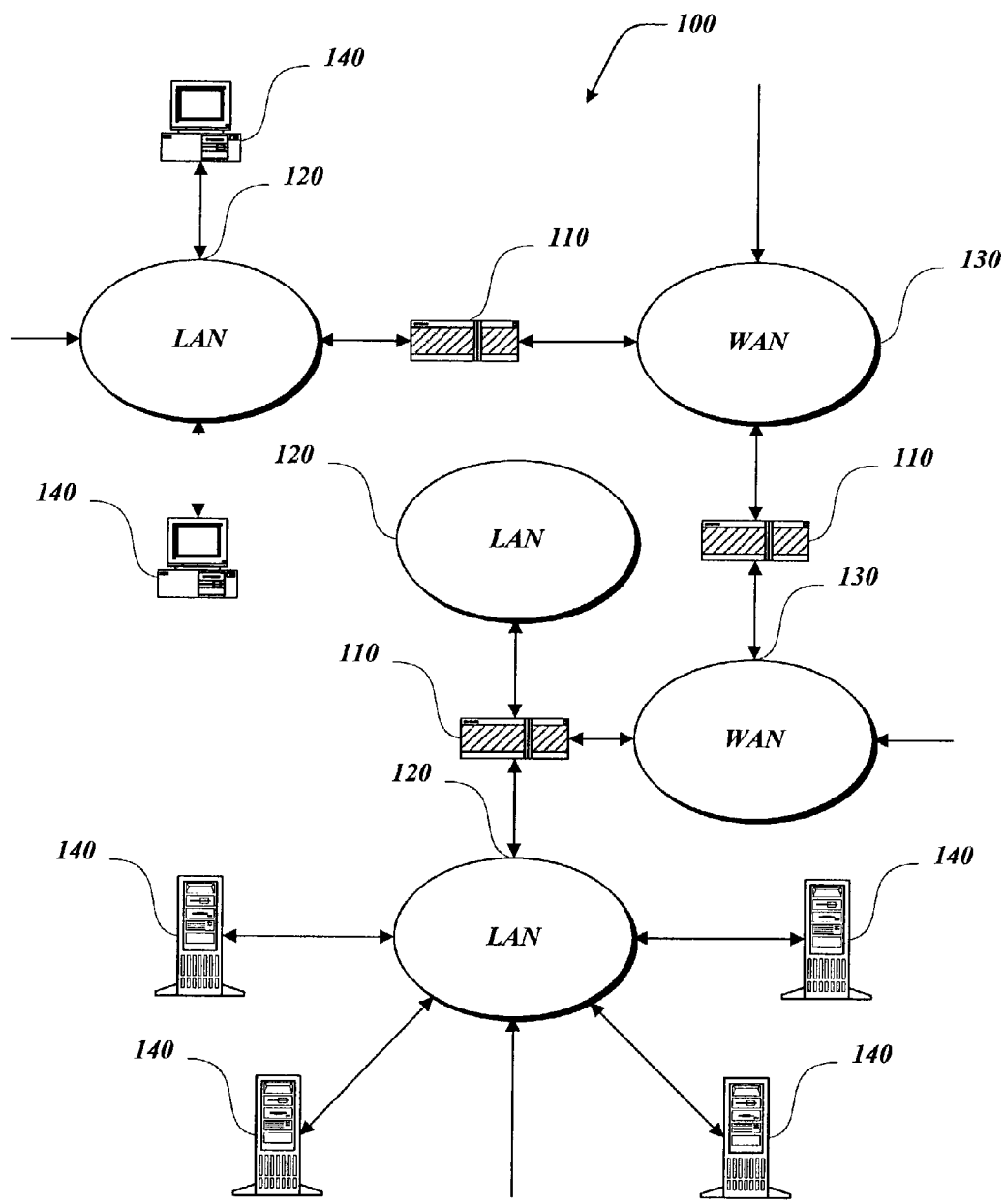
FIG. 1 is a illustration of a representative portion of an internetwork such as the Internet.

The term "Internet" refers to a collection of networks and routers capable of communicating with one another. A representative section of the Internet 100 is shown in FIG. 1. The representation section of the Internet 100 shown in FIG. 1 includes a plurality of LANs 120 and WANs 130 interconnected by routers 110. The routers 110 are generally special purpose computers used to interface one LAN or WAN to another. Communication links within the LANs may be formed by twisted pair wire, coaxial cable, or any other well-known communication linkage technology, including wireless technology. Communication links between networks may be formed by 56 Kbps analog telephone lines, or 1 Mbps digital T-1 lines and/or 45 Mbps T-3 lines or any other well-known communication linkage technology, including wireless technology. Further, computers and other related electronic devices 140 can be remotely connected to either the LANs 120 or the WANs 130 via a modem and temporary telephone link, including a wireless telephone link. Such computers and electronic devices 140 are shown in FIG. 1 as connected to one of the LANs 120. It will be appreciated that the Internet 100 comprises a vast number of such interconnected networks, computers, and routers and that only a small, representative section of the Internet 100 is shown in FIG. 1.

Figure 2:
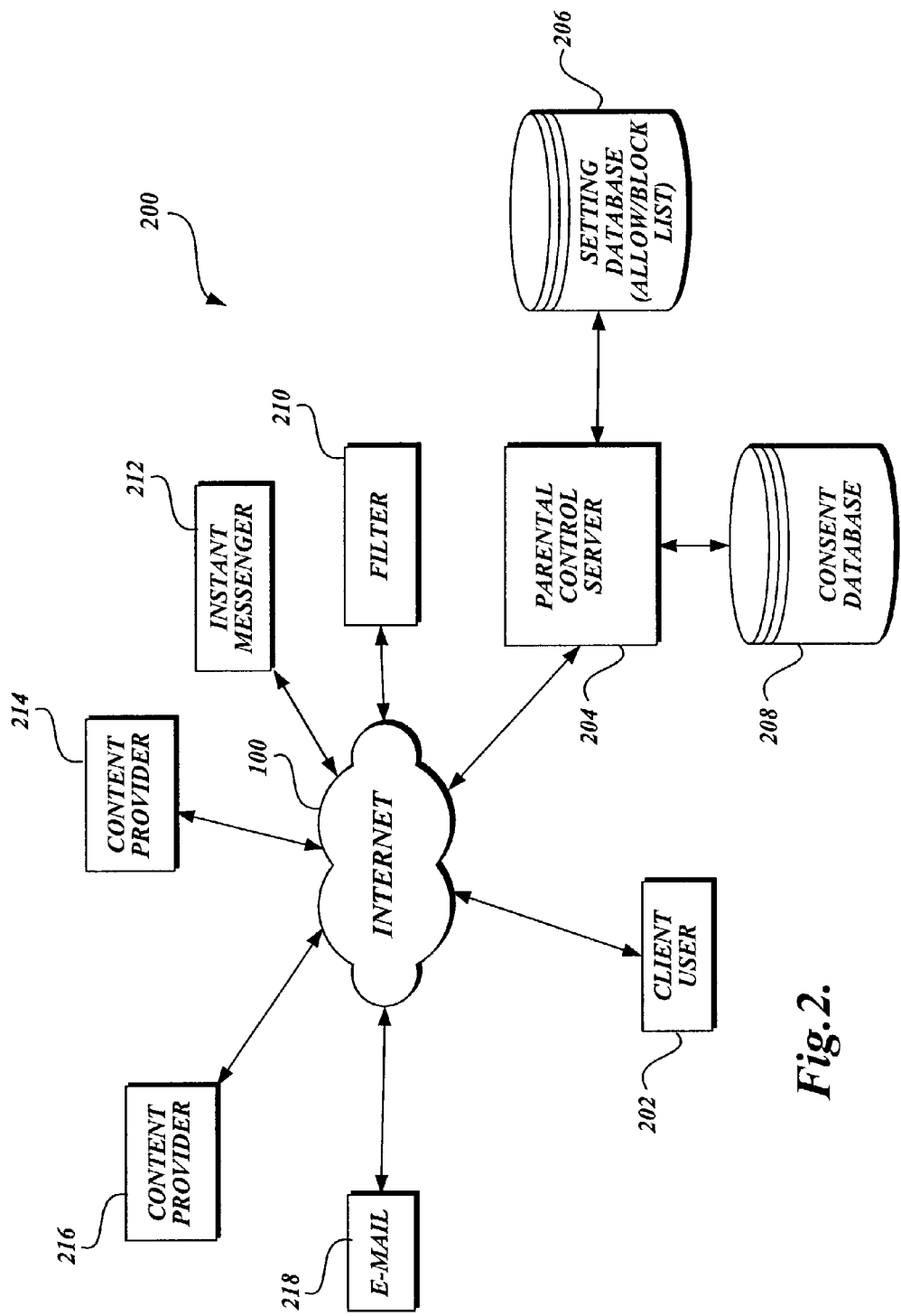
FIG. 2 is a block diagram illustrative of a parental control system in accordance with one exemplary embodiment of the present invention.

FIG. 2 is a block diagram of a parental control system 200 for implementing parental controls in accordance with the invention. The parental control system 200 shown in FIG. 2 includes a client 202, parental control server 204, filter 210, instant messenger 212, content providers 214 and 216, and e-mail 218, interconnected by an internetwork, such as Internet 100. Also shown in FIG. 2 is a setting database 206 in communication with the parental control server 204 and a consent database 208 also in communication with the parental control server 204. The setting database 206 includes an allow/block list as shown in parenthesis in FIG. 2. In alternative embodiments of the present invention, the setting database 206 may reside on the parental control server 204 or on another computing device that is in communication with the parental control server 204. Similarly, the consent database 208 may reside on the parental control server 204 or on another computer device in communication with the parental control server 204. Additionally, while only one client user device 202 is shown, it will be appreciated that many such devices may be included in the parental control system 200. Similarly, while only two content providers 214 and 216 and two online services, e-mail 218 and instant messenger 212, are shown in FIG. 2, it will be appreciated that many other content providers and online services may be connected to the Internet 100. Further, while the filter 210 and the setting database 206, which includes the allow/block list, are shown as being in communication across the Internet 100, the filter 210 and the allow/block list may be downloaded to the client 202, which may enhance performance. Communications between the client 202, parental control server 204, setting database 206, consent database 208, filter 210, instant messenger 212, content providers 214 and 216, and e-mail 218, are further described below in relation to FIGS. 3, 4A-4B, and 5A-5B.

Figure 3:
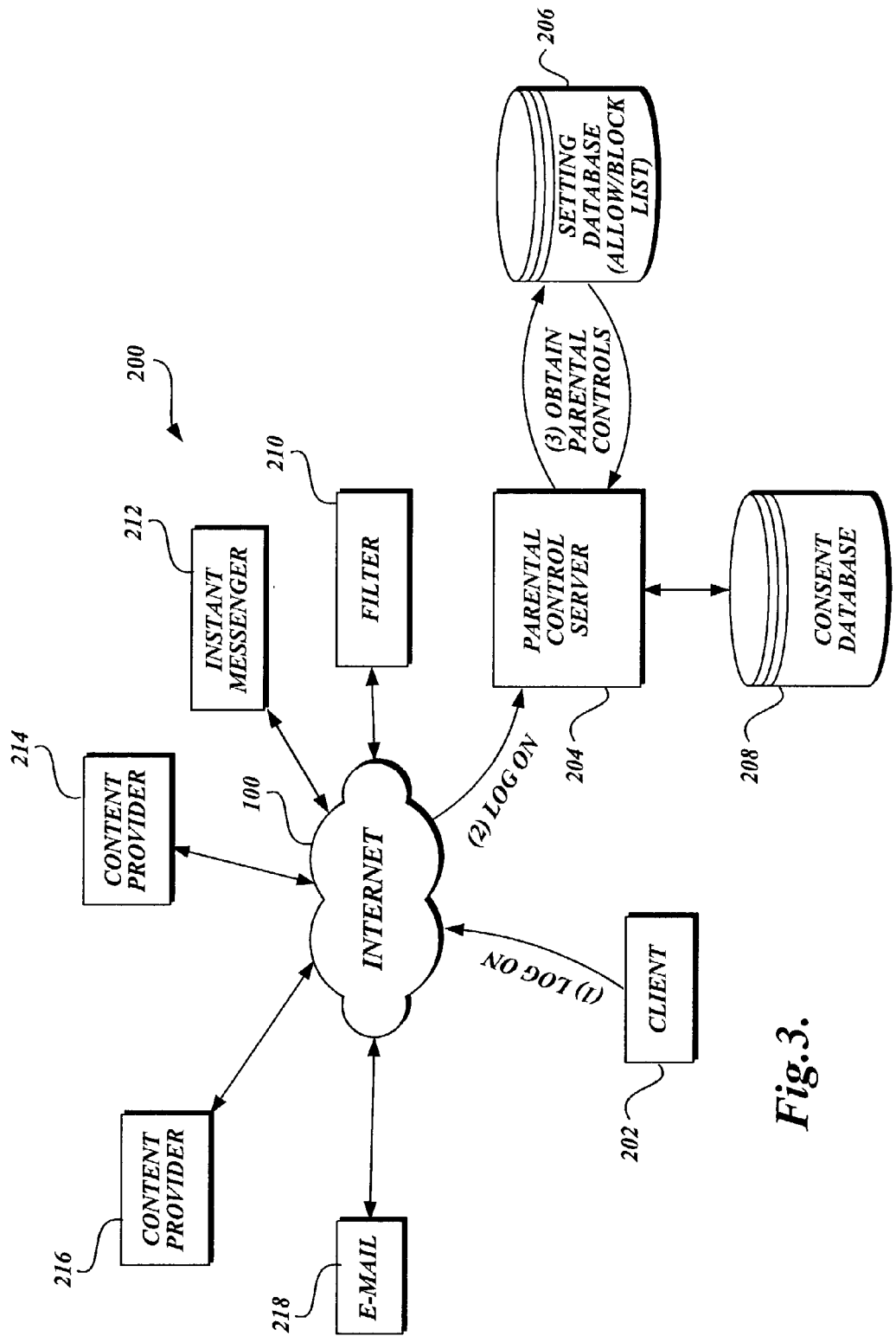
FIG. 3 is a block diagram of the parental control system of FIG. 2 illustrating obtaining parental controls in accordance with one exemplary embodiment of the present invention.

With reference to FIG. 3, an illustrative process for logging on to the Internet and accessing the parental controls server 204 will be described. The process is initiated by the client 202 connecting to the Internet 100. Those of ordinary skill in the art will appreciate that there are various different ways to connect to the Internet 100. For example, the user may have an account with an Internet service provider (ISP) that supplies Internet connectivity services to individuals, businesses, and other organizations. Alternatively, the user may connect to the Internet through a high-speed communications line, such as a T1 carrier line, that can handle digital communications. Another alternative is the user connected to the Internet through a digital subscriber line (DSL) that also provides high-speed transmissions over standard copper telephone wiring. As another example, the user may utilize a dial-up service, which is a telephone connection provider for a local or worldwide public switch telephone network that provides Internet or intranet access and other resources. The present invention is not limited to any particular process of connecting to the Internet 100.

After the user has connected to the Internet 100, the user is directed to the parental control server 204 and logs onto the parental control server 204. The user identifies himself to the parental control server 204 by providing identification information, such as a username and a password. The parental control server 204 authenticates the user utilizing authenticating processes well-known by those of ordinary skill in the art. The parental control server 204 then queries the setting database 206 for the parental controls for the user. In the illustrated embodiment, the setting database 206 includes the allow/block list, which includes a list of parentally controlled actions. The allow/block list includes an allow list of the actions allowed by the parent. The allow/block list also includes a block list of the actions blocked by the parent. Thus the allow/block list includes customized parental controls for the user logging into the client 202. After querying the setting database 206, the parental control search results, including the allow/block list for the user, are provided to the parental control server 204.

Figure 4A:
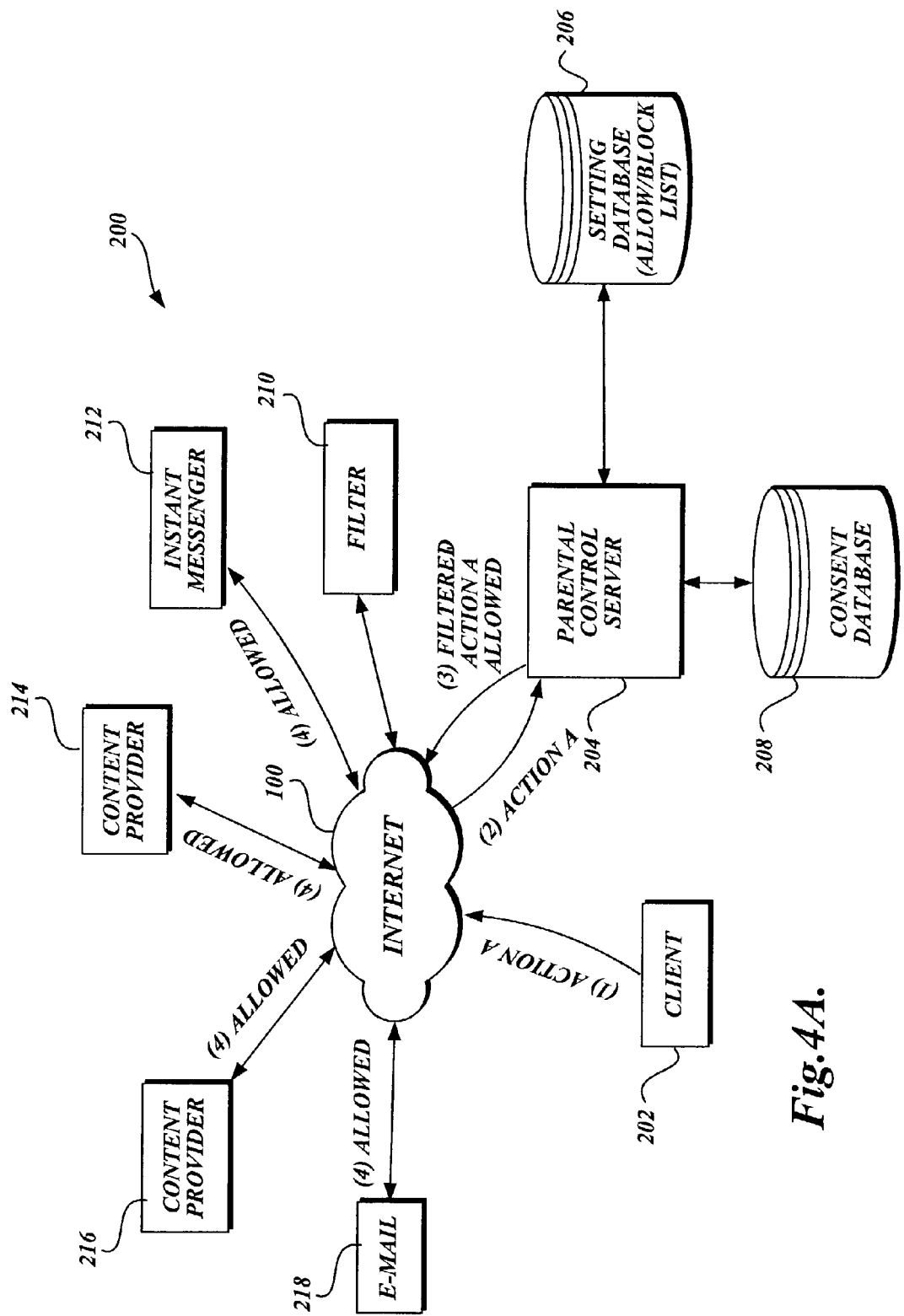
FIGS. 4A and 4B are block diagrams of the parental control system of FIG. 2 illustrating parentally controlled user actions in accordance with one exemplary embodiment of the present invention.
Figure 4B:
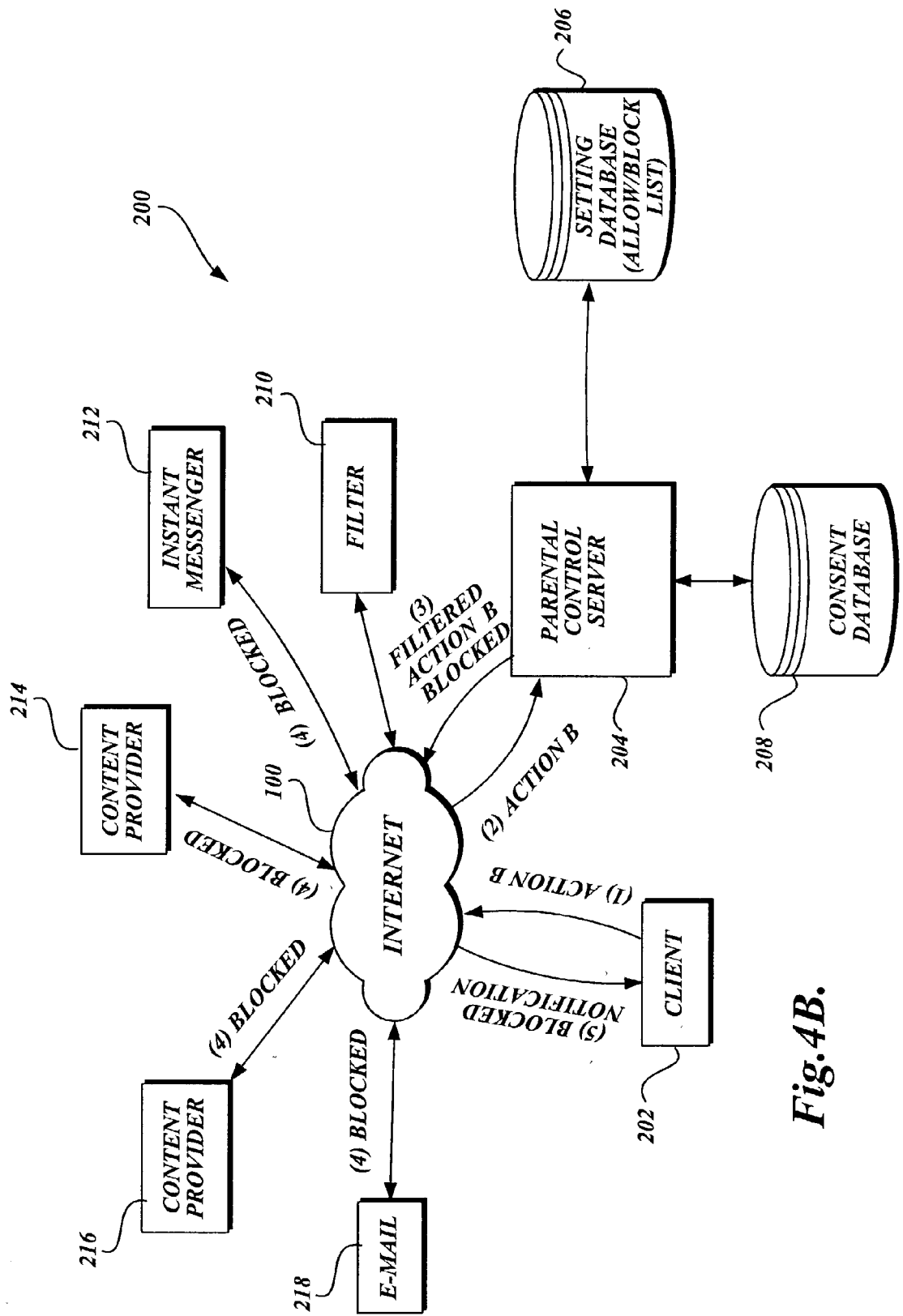

FIGS. 4A and 4B are block diagrams illustrating the process of using the parental controls system 200 to filter the user's online actions in accordance with one embodiment of the present invention. FIG. 4A illustrates a user taking an action that is allowed by the parental controls system 200. FIG. 4B illustrates a user attempting to take an action that is blocked by the parental controls system 200.

FIG. 4A illustrates the user submitting a request to perform action A, which includes any online action. For example, action A may be sending an electronic message using the Internet-based e-mail 218 service. Or action A may be sending an instant message using an Internet-based instant messenger 212 service. Or action A may be visiting Web sites for accessing information provided by content providers 214 and 216. Or action A may be having more time online. If action A is not found on the block list, action A is allowed, as illustrated in FIG. 4A. After the user has submitted a request to take action A, the parental control server 204 receives the user's request to take action A. For example, in one embodiment of the present invention, the computer detects that the users s allowed time online is about to expire. The user is notified that the allowed time online is about to expire and is prompted to submit a request for more time online. In this exemplary embodiment of the invention, the parental control server 204 uses the allow/block list to determine whether or not the user should be allowed to perform action A. Alternatively, the parental control server 204 may download all or a portion of the allow/block list to the client 202 so that the client 202 can apply the downloaded portions of the allow/block list to determine if action A should be allowed.

In an alternative embodiment of the present invention, the parental control server 204 uses filter 210 in addition to the allow/block list to determine whether or not the user should be allowed to perform action A. The filter may be an inappropriate word filter, for example. Alternatively, the parental control server 204 may download all or a portion of a filter, such as filter 210 and all or a portion of the allow/block list to the client 202. In such an embodiment of the invention, the client 202 will apply the downloaded portions of filter 210 and the allow/block list to determine whether action A should be allowed. If filter 210 does not block action A and if action A is not found in the block list, action A is allowed as illustrated in FIG. 4A. Those of ordinary skill in the art will appreciate that the present invention may be practiced utilizing various configurations of the allow/block list and filter 210.

FIG. 4B illustrates the user attempting to take action B and action B is blocked by the parental control server 204. More specifically, action B is blocked if the parental control server 204 determines action B is not in the user's allow list and/or action B is blocked by filter 210. That is, the parental control system 200 will block action B even if action B is not on the user's block list if action B is blocked by filter 210 and vice versa. As described above, different embodiments of the present invention block action B at the client level by downloading all or portions of the filter 210 and the allow/block list. FIG. 4B also illustrates that the user is notified that action B has been blocked by the parental control system 200.

Figure 5A:
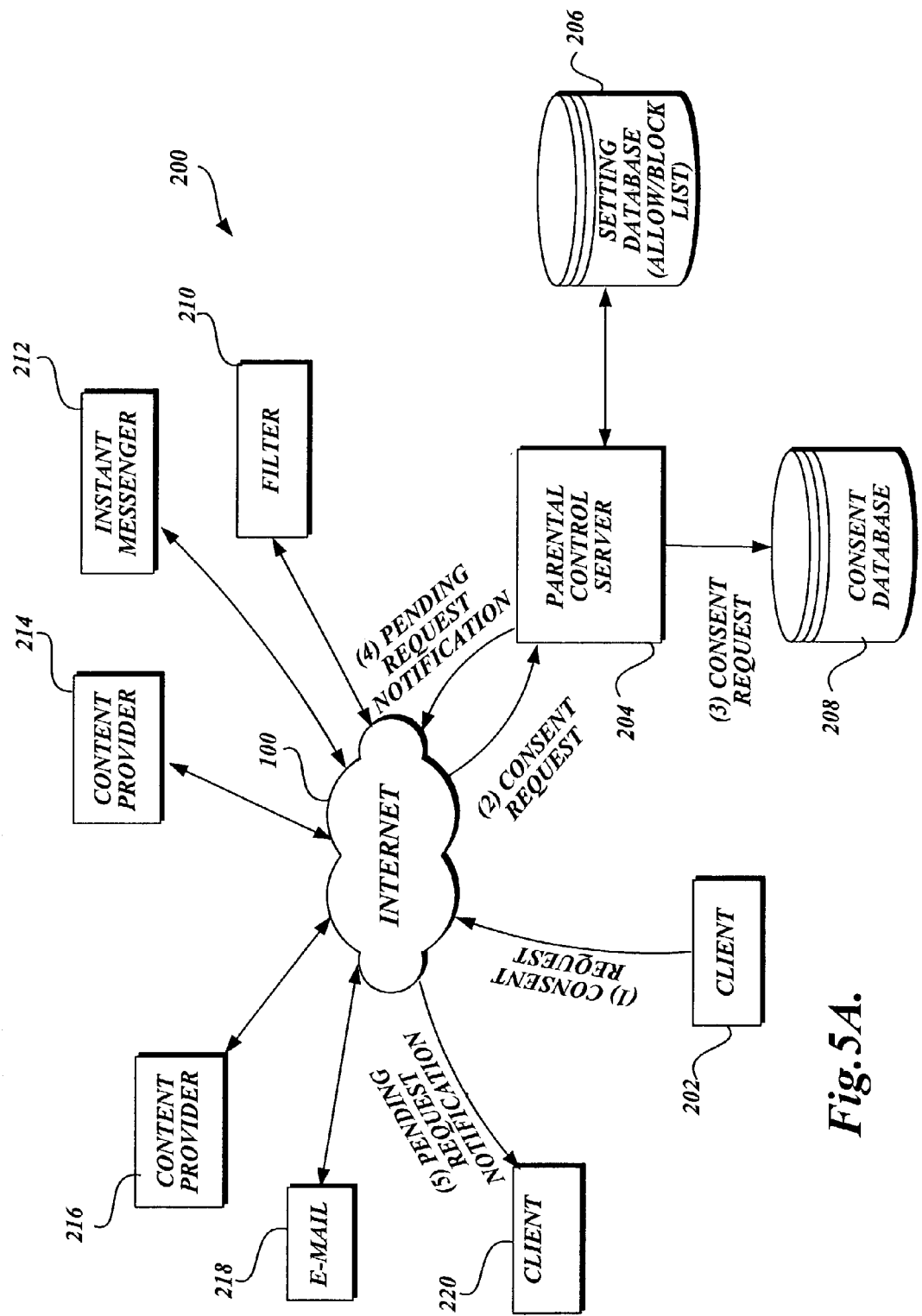
FIGS. 5A, 5B, and 5C are block diagrams of the parental control system of FIG. 2 illustrating the customization of the parental controls in accordance with one exemplary embodiment of the present invention.

FIG. 5A is a block diagram illustrating the user requesting consent to perform the blocked action B. As illustrated in FIG. 5A, the user submits a request for consent that is received by the parental control server 204. The parental control server 204 creates an entry in the consent database 208 for the request. In the illustrated embodiment, the parental control server 204 transmits a pending request notification through the Internet to another client 220. The other client 220 may be the parent or administrator of the client 202. In an alternative embodiment, the pending request notification is provided to the other client 220 when the other client 220 is detected logging onto the parental control server 204. The parental control server 204 queries the consent database 208 and notifies the other client 220 if any pending requests from the client 202 are found.

Figure 5B:
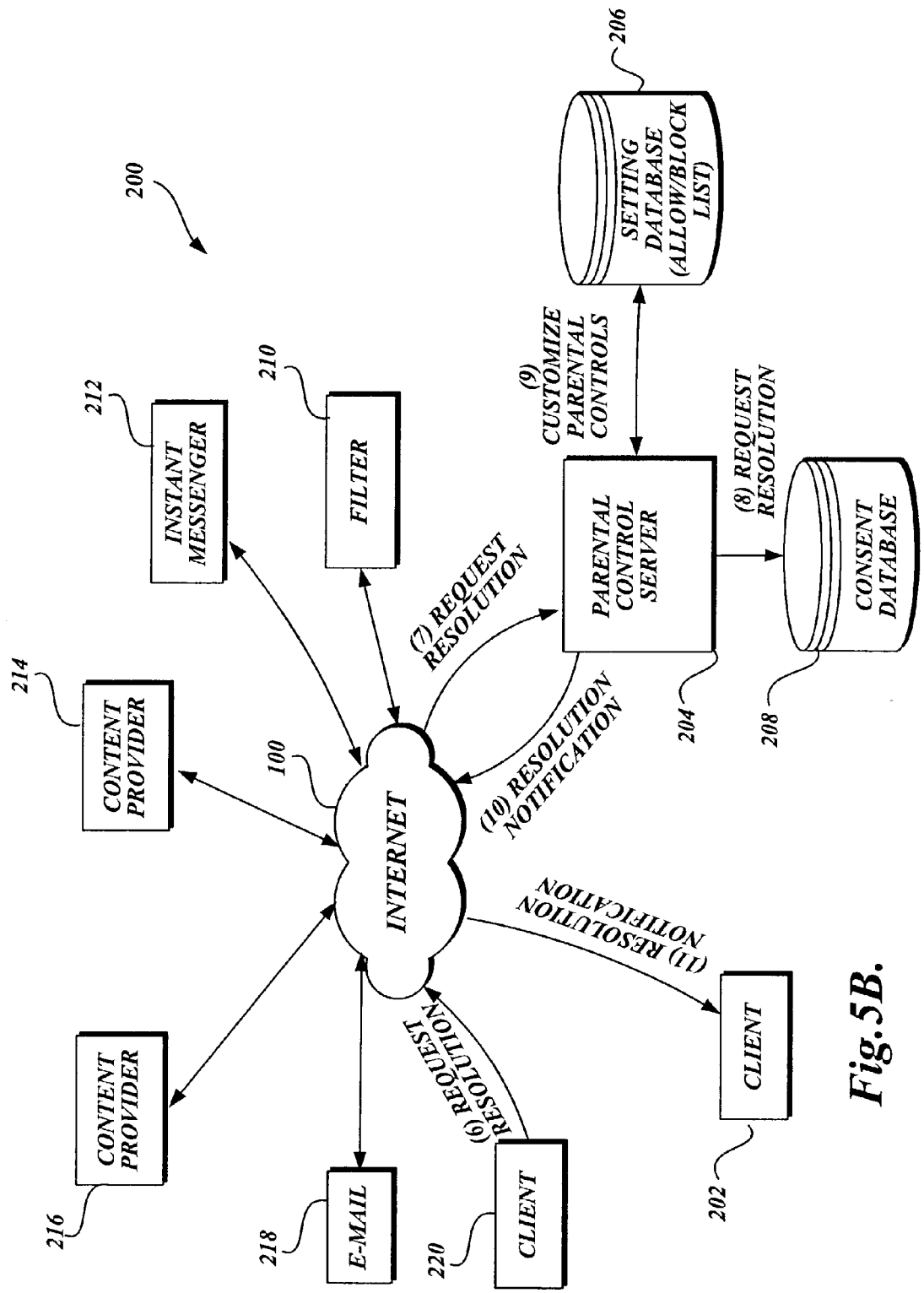

FIG. 5B is a block diagram illustrating resolution of the pending request for consent to perform action B. As illustrated in FIG. 5B, the other client 220 submits a request resolution through the Internet to the parental control server 204. The request resolution indicates an acceptance or denial of the request. The parental control server 204 receives the request resolution and updates the consent database 208 with the request resolution information. The parental control server 204 customizes the parental controls by updating the allow/block list for the client 202 in the setting database 208 to reflect the request resolution. If the request resolution indicates acceptance, the action is added to the user's allow list. On the other hand, if the request resolution indicates denial, the action is added to the block list. Preferably, the denied action is not added to the block list if the action was previously blocked. In accordance with the illustrated embodiment, the parental control server 204 transmits a request resolution notification through the Internet to the client 202. In an alternative embodiment, the request resolution notification is provided when the client 202 is detected logging onto the parental control server 204. The parental control server 204 queries the consent database 208 and notifies the client 202 if any newly resolved requests are found.

Figure 5C:
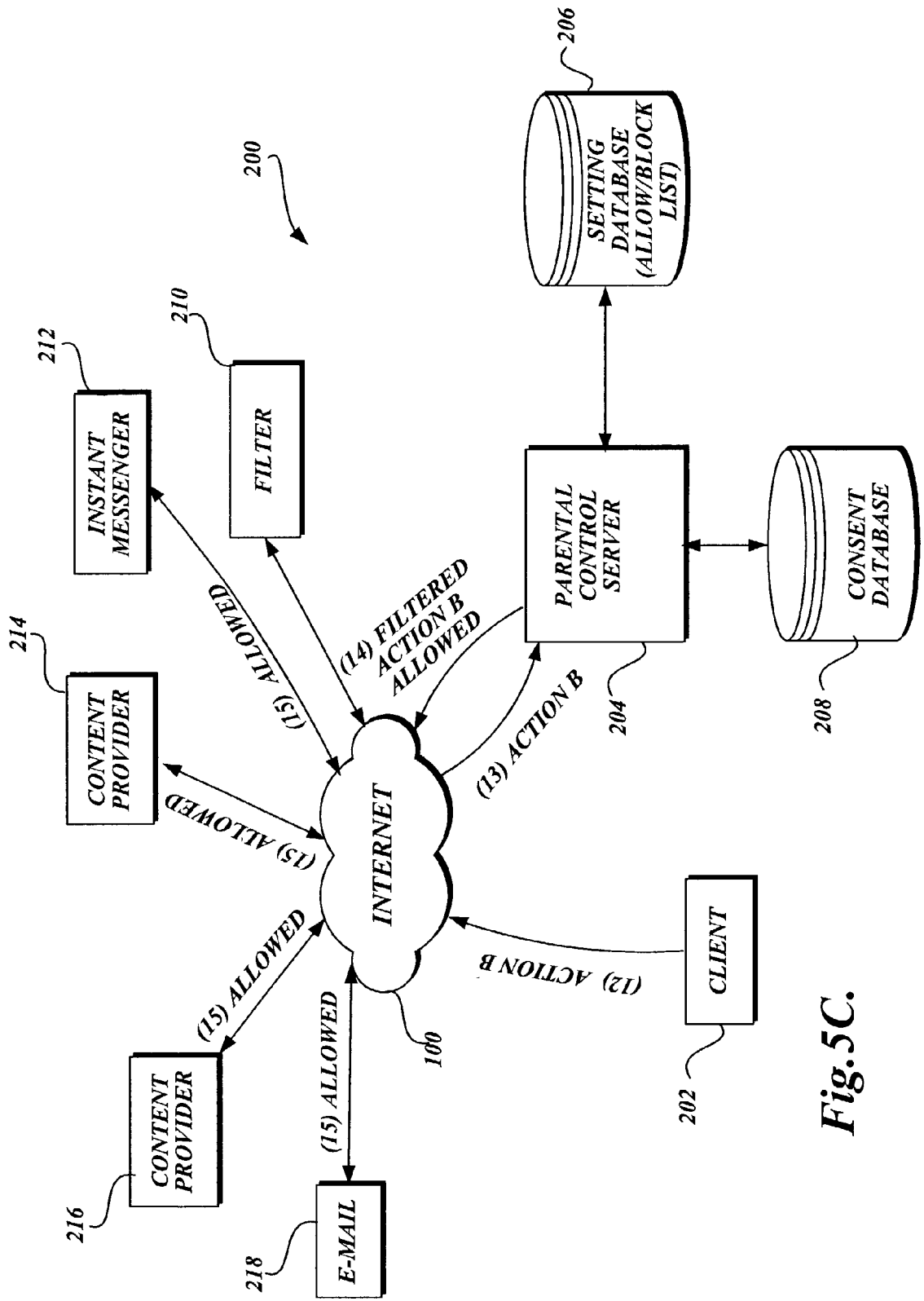

FIG. 5C is a block diagram illustrating use of customized parental controls provided by the updated allow/block list. As illustrated in FIG. 5C, the client 202 is allowed to perform action B, which was previously blocked. In FIG. 5C the client 202 is allowed to perform action B by virtue of the customized parental controls in the allowed block list in the setting database 206. In FIG. 5C, the client 202 submits a request to take action B. The request for action B is transmitted through the Internet 100 to the parental control server 204. The parental control server 204 utilizes the allow/block list in the setting database 206 to determine if the user (i.e., the person logging onto the client 202) is allowed to take action B. Since action B has been added to the user's allow list, thereby customizing the parental controls, the user is allowed to take action B. As discussed earlier, action B can include any online action. For example, action B may be to use an Internet service, such as the instant messenger 212 and the e-mail 218. Or, action B may be to the content providers 214 and 216 Web sites. In one implementation of the present invention, the client 202 is a child of the other client 220. FIGS. 3, 4A, 4B, and 5A-5C, illustrate one exemplary embodiment of the present invention for enabling a user (i.e., a child) and an administrator (i.e., a parent) to interactively customize the allow/block list used for filtering the user's online actions.

Figure 7A:
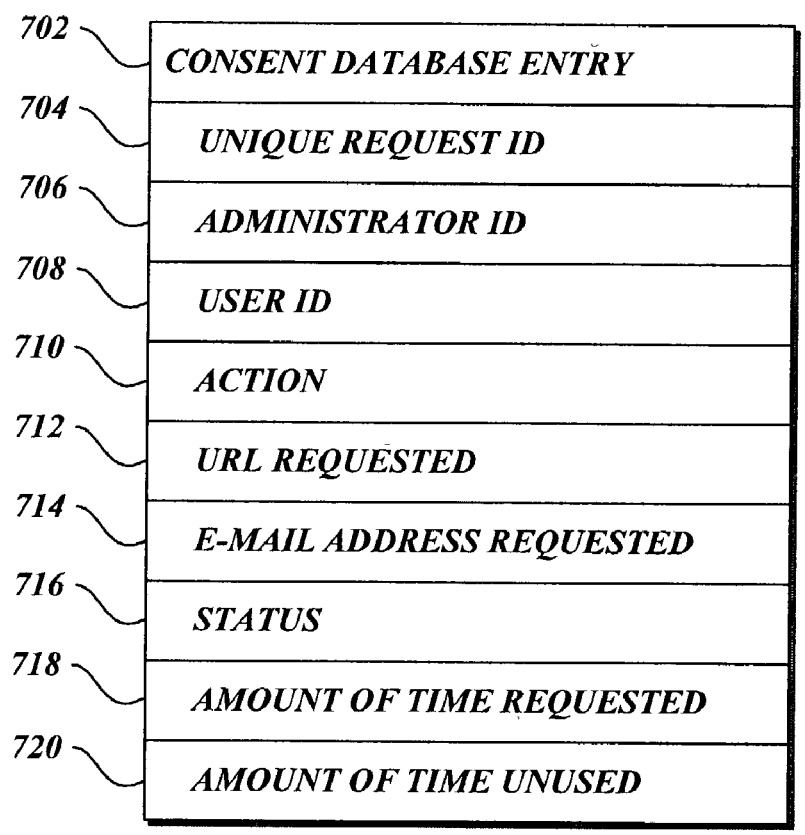
FIG. 7A is a block diagram showing an illustrative data structure utilized by an exemplary embodiment of the parental control system.

FIG. 7A illustrates an exemplary data structure used to create an entry in the consent database 208. The illustrated consent database entry data structure 702 includes a plurality of data elements, namely, for a unique request ID 704, an administrator ID 706, a user ID 708, an action 710, a URL requested 712, an e-mail address requested 714, a status 716, an amount of time requested 718, and an amount of time unused 720. The unique request ID 704 includes information that uniquely identifies the request. For example, the unique request ID 704 can be a globally unique identifier (GUID) generated by the parental control system 200. The administrator ID 706 includes information for identifying the administrator. For example, the administrator ID 706 can be a password used by the administrator when logging onto the Internet 100. The user ID 708 includes information for identifying the user. For example, the user ID 708 can be a password used by the user when logging onto the Internet 100. The action 710 includes information about the action associated with the request. The action can be any online action that a user requests consent to perform, such as visiting a Web site, downloading a file, having more time online, sending an e-mail, and sending an instant message. Additionally, the action can be one the administrator has requested to be allowed or blocked using the history integration feature of the present invention, which is discussed below in with reference to FIGS. 15 and 16. The URL requested 712 includes information about an address for a resource on the network, such as a Uniform Resource Locator for a resource on the Internet 100. The e-mail address requested 714 includes information about the address of an e-mail recipient. An e-mail address is a string that identifies a user so that the user can receive Internet e-mail. An e-mail address typically consists of a name that identifies the user to the mail server, followed by an at sign (@) and the host name and domain name of the mail server. The status 716 includes information about the status of the request, such as pending, resolved, accepted, denied, and reviewed. The amount of time requested 718 includes information about a request associated with an allotted amount of time the user is allowed online. The amount of time unused 720 includes information about the amount of time online that the user still has available.

Figure 7B:
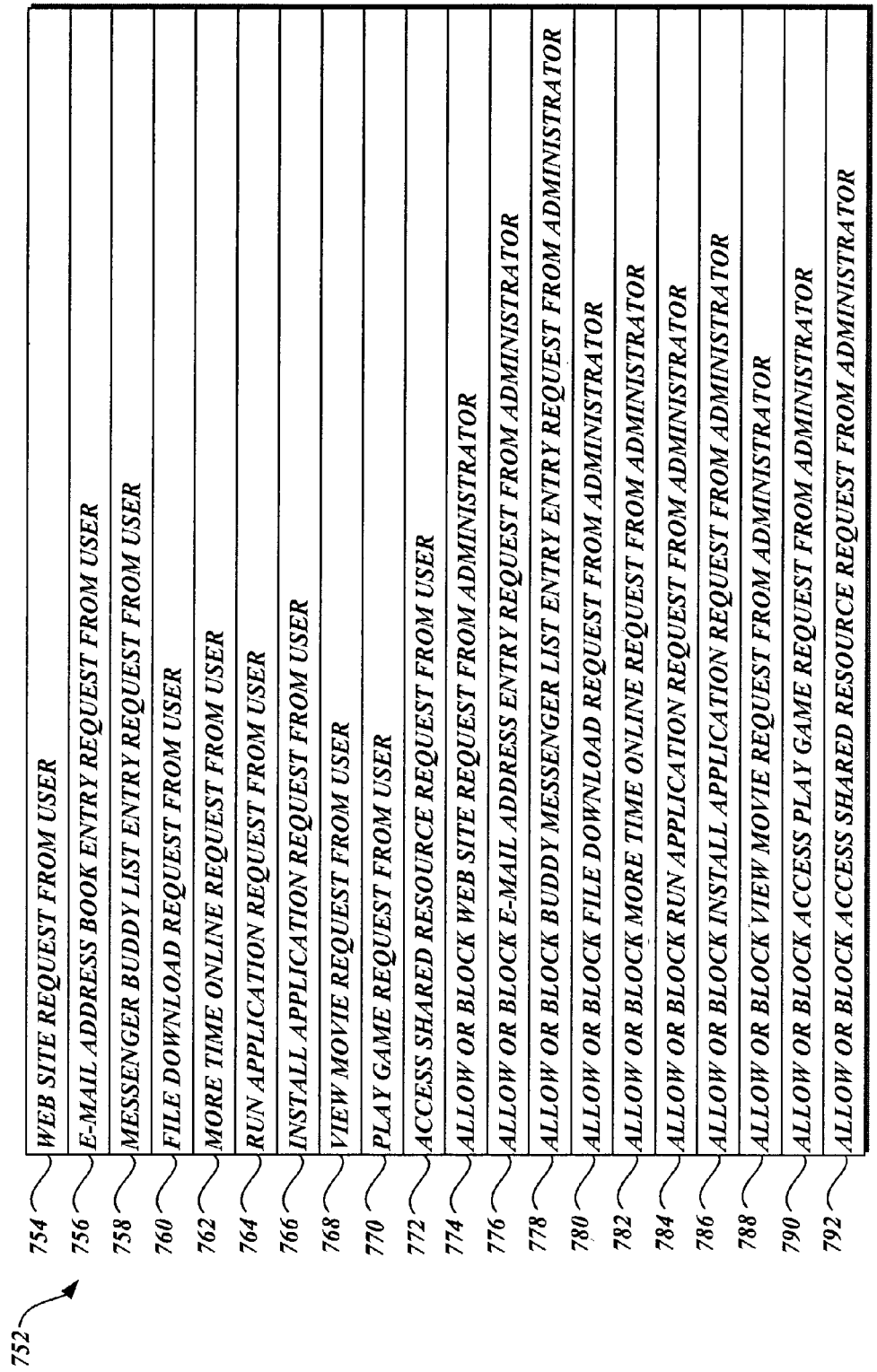
FIG. 7B is a block diagram showing a table of parentally controlled actions in accordance with one exemplary embodiment of the present invention.

FIG. 7B illustrates a few of the many possible requested online actions 752 for customizing the parental controls using the present invention. For example, the user requested actions can include a Web site request 754 from user, an e-mail address book entry request 756 from user, a messenger buddy list entry request 758 from user, a file download request 760 from user, a more time online request 762 from user, a run application request 764 from user, an install application request 766 from user, a view movie request 768 from user, a play game request 770 from user, and an access shared resource request 772 (e.g., a file server or printer) from user. Some of the administrator requested online actions can include an allow or block Web site request 774 from administrator, an allow or block e-mail address entry request 776 from administrator, an allow or block buddy messenger list entry request 778 from administrator, an allow or block file download request 780 from administrator, an allow or block more time online request 782 from administrator, an allow or block run application request 784 from administrator, an allow or block install application request 786 from administrator, an allow or block view movie request 788 from administrator, an allow or block access play game request 790 from administrator, and an allow or block access shared resource request 792 from administrator. The administrator requests for allowing and blocking actions are discussed below with reference to FIGS. 15 and 16, which illustrate the history integration feature of the present invention.

Figure 8:
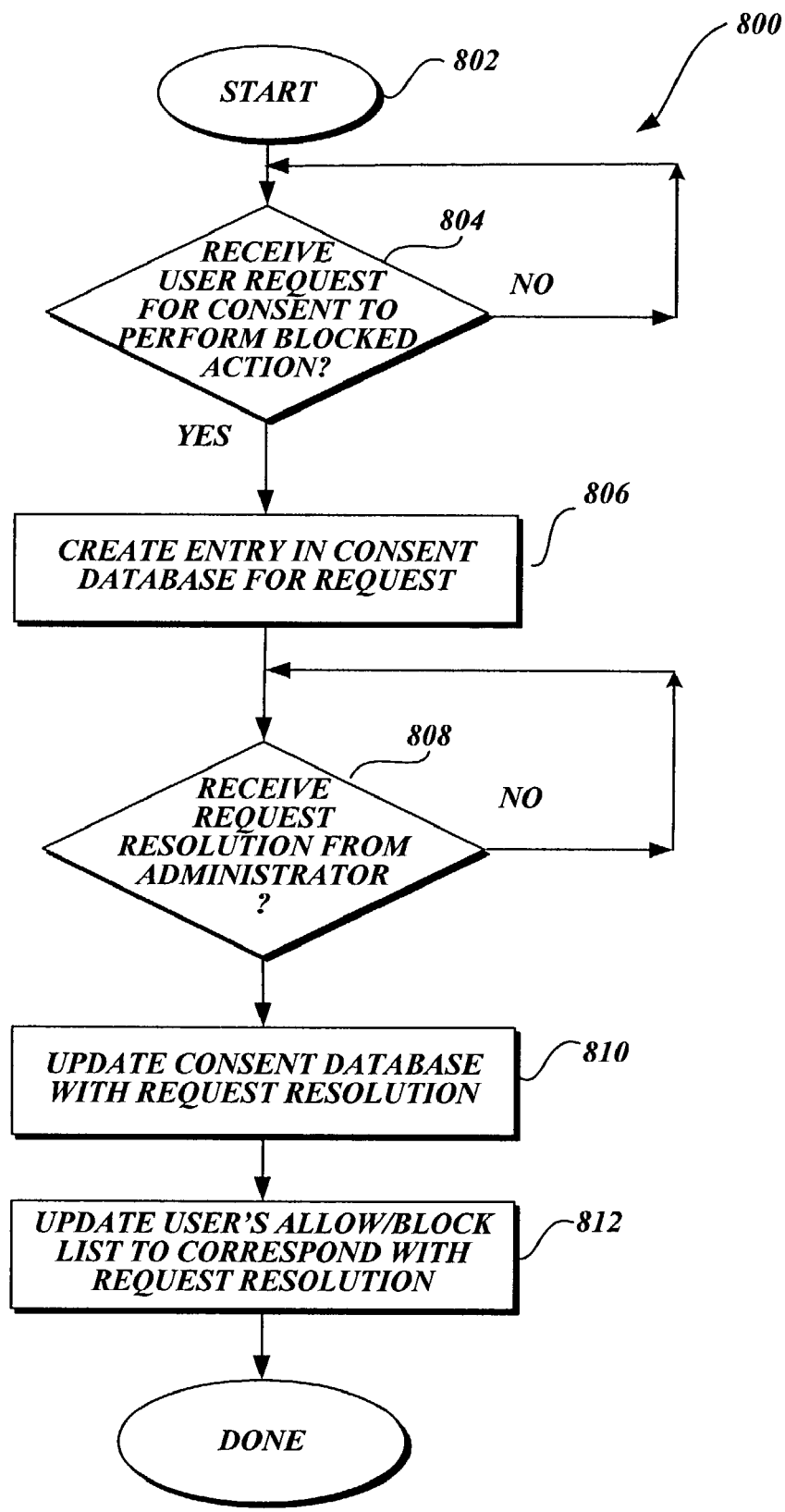
FIG. 8 is an overview flow diagram illustrating the logic utilized in one embodiment of the present invention.

FIG. 8 is an overview flow diagram illustrating the logic utilized by the parental controls system 200 in accordance with one embodiment of the present invention. The parental controls routine 800 illustrated in FIG. 8 begins at block 802 and proceeds to decision block 804. At decision block 804, a test is made to determine whether or not a request has been received from the user for consent to perform a blocked online action. If at decision block 804, it is determined that a request has been received from the user, routine 800 proceeds to block 806. At block 806, routine 800 creates an entry in the consent database 208 for the request. If at decision block 804, it is determined that a request from the user has not been received, routine 800 cycles back until a request is received. After creating the entry in the consent database 208 for the request at block 806, routine 800 proceeds to decision block 808. At decision block 808, a test is made to determine whether a request resolution has been received from the administrator. If it is determined at decision block 808 that a request resolution was not received from the administrator, routine 800 cycles back until a request resolution is received from the administrator. If it is determined at decision block 808 that a request resolution was received from the administrator, routine 800 proceeds to block 810. At block 810, routine 800 updates the consent database 208 with the request resolution information. After updating the consent database 208, routine 800 proceeds to block 812 to update the user's allow/block list to correspond with the request resolution. After updating the user's allow/block list to correspond with the request resolution, routine 800 ends.

Figure 9:
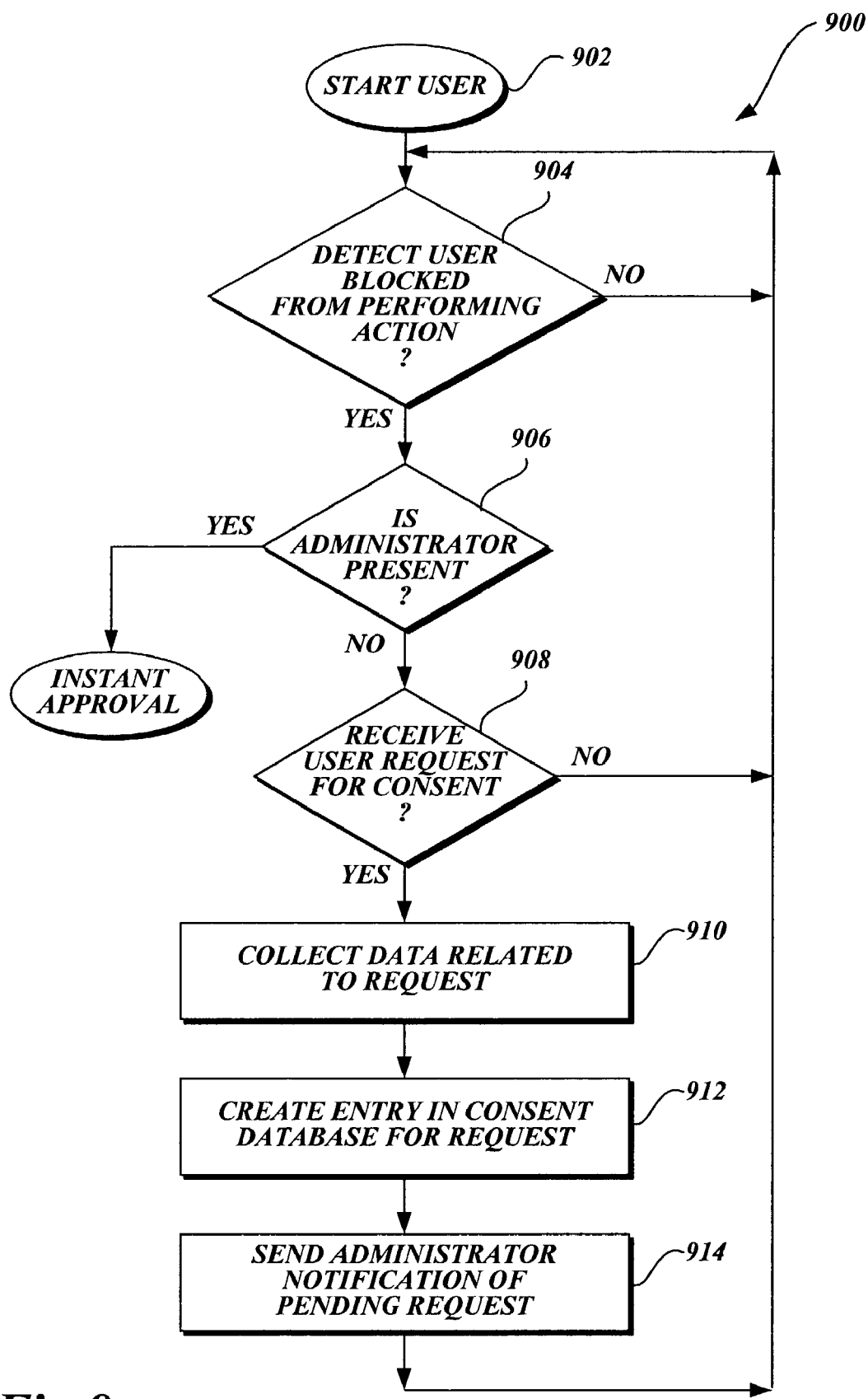
FIG. 9 is a flow diagram illustrating a routine for receiving a user request formed in accordance with one exemplary embodiment of the present invention.

FIG. 9 is a flow diagram illustrating routine 900 for receiving a request from a user and creating an entry in the consent database 208 in accordance with one embodiment of the present invention. (Blocks 804 and 806 of FIG. 8.) Routine 900 starts at block 902 and proceeds to decision block 904, where a test is made to determine if the user has been blocked from performing an online action. For example, in one embodiment of the present invention, the computer determines if the user's allowed time online is about to expire. If so, the user is notified that the allowed time online is about to expire. If at decision block 904 it is determined that the user was not blocked from performing an online action, routine 900 cycles back until decision block 904 tests positive. If at decision block 904, it is determined that the user was blocked from performing an online action, routine 900 proceeds to decision block 906. For example, at decision block 906, a test is made to determine if the administrator is present. In one embodiment of the present invention, the user is prompted with a query as to whether the administrator is present for instant approval of the user's request. If at decision block 906, it is determined that the administrator is present, routine 900 proceeds to the instant approval routine. The instant approval routine is described below with reference to FIG. 13. If at decision block 906, it is determined that the administrator is not present, routine 900 proceeds to decision block 908.

At decision block 908, a test is made to determine if the user would like to submit a request for consent from the administrator to perform the blocked online action. If at decision block 908, it is determined that the user does not want to submit the consent request, routine 900 cycles back to decision block 904 and the above steps are repeated. If at decision block 908, it is determined that a user request for consent was received, routine 900 proceeds to block 910 where information related to the request is collected. In one embodiment of the present invention, routine 900 collects the data related to the request that was described above with reference to data structure 700 shown in FIG. 7A. For example, routine 900 collects data related to the request, including the administrator ID, the user ID, and the action requested. If the request is related to accessing a resource on the Internet, routine 900 collects the URL requested. Similarly, if the request is related to sending or receiving an e-mail, routine 900 collects the e-mail address. Likewise, if the request is related to having more time online, routine 900 collects information about the amount of time requested and the amount of time unused.

After collecting the data related to the request at block 910, routine 900 proceeds to block 912 and creates an entry in consent database 208 for the request. In one embodiment, routine 900 creates the entry using the data structure 700 described above with reference to FIG. 7A. After creating the entry in the consent database 208 for the request, routine 900 proceeds to block 914. In one embodiment of the present invention, routine 900 sends the administrator notification of the pending request. The notification can be sent utilizing any of the various ways known by those of ordinary skill in the art. For example, the notification can be sent via e-mail and instant messaging. The pending request notification sent to the administrator may include an element linked to a Web site. The administrator can navigate to the Web site by clicking on the linked element in the pending request notification. The Web site displays information about the pending request. In yet other embodiments of the present invention, the administrator is provided notification of the pending request at the time the administrator logs on, as described below with reference to FIG. 10.

Figure 10:
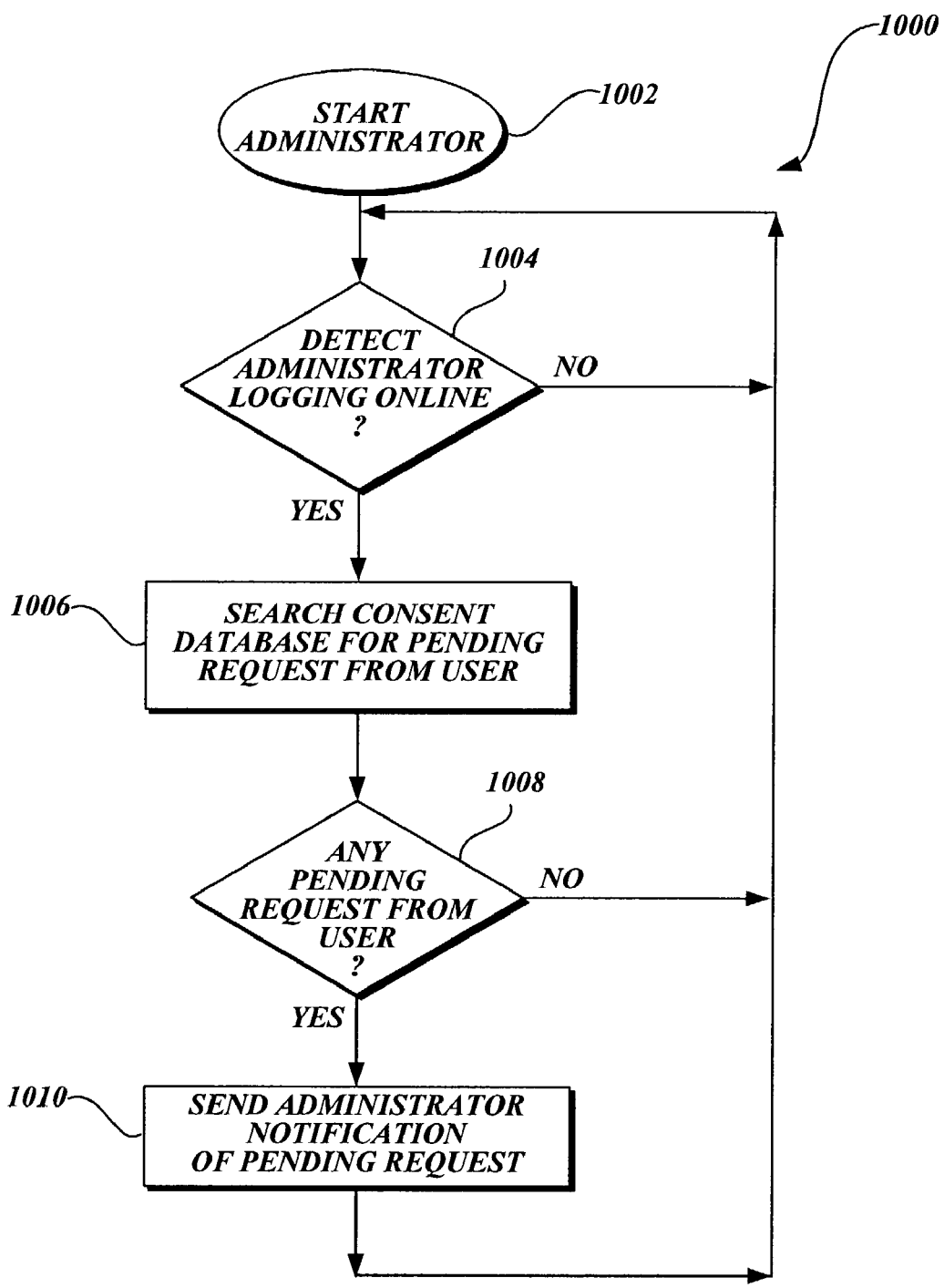
FIG. 10 is a flow diagram illustrating a routine for notifying an administrator of a pending request formed in accordance with one exemplary embodiment of the present invention.

FIG. 10 illustrates a routine 1000 for notifying the administrator of a pending request in accordance with one embodiment of the present invention. Routine 1000 starts at block 1002 and proceeds to decision block 1004 where a test is made to determine if the administrator has been detected logging on. If at decision block 1004, it is determined that the administrator was not detected logging on, routine 1000 cycles back until decision block 1004 tests positive. If at decision block 1004, it is determined that the administrator was detected logging on, routine 1000 proceeds to block 1006. At block 1006, routine 1000 searches the consent database 208 for a pending request from the user for consent to perform a blocked online action. After searching the consent database 208 for a pending request at block 1006, routine 1000 proceeds to decision block 1008. At decision block 1008, a test is made to determine if a pending request from the user was found in the consent database 208. If at decision block 1008, a pending request is not found in consent database 208, routine 1000 cycles back to decision block 1004 and the above described steps are repeated. If at decision block 1008, a pending request is found in the consent database 208, routine 1000 proceeds to block 1010 where the administrator is sent notification of the pending request. The consent database 208 may contain multiple pending requests. If so, multiple pending requests will be found at decision block 1008 and the administrator will be sent notification of the multiple pending requests. After sending notification to the administrator of the pending request, routine 1000 cycles back to decision block 1004 and the above described steps are repeated.

Figure 11:
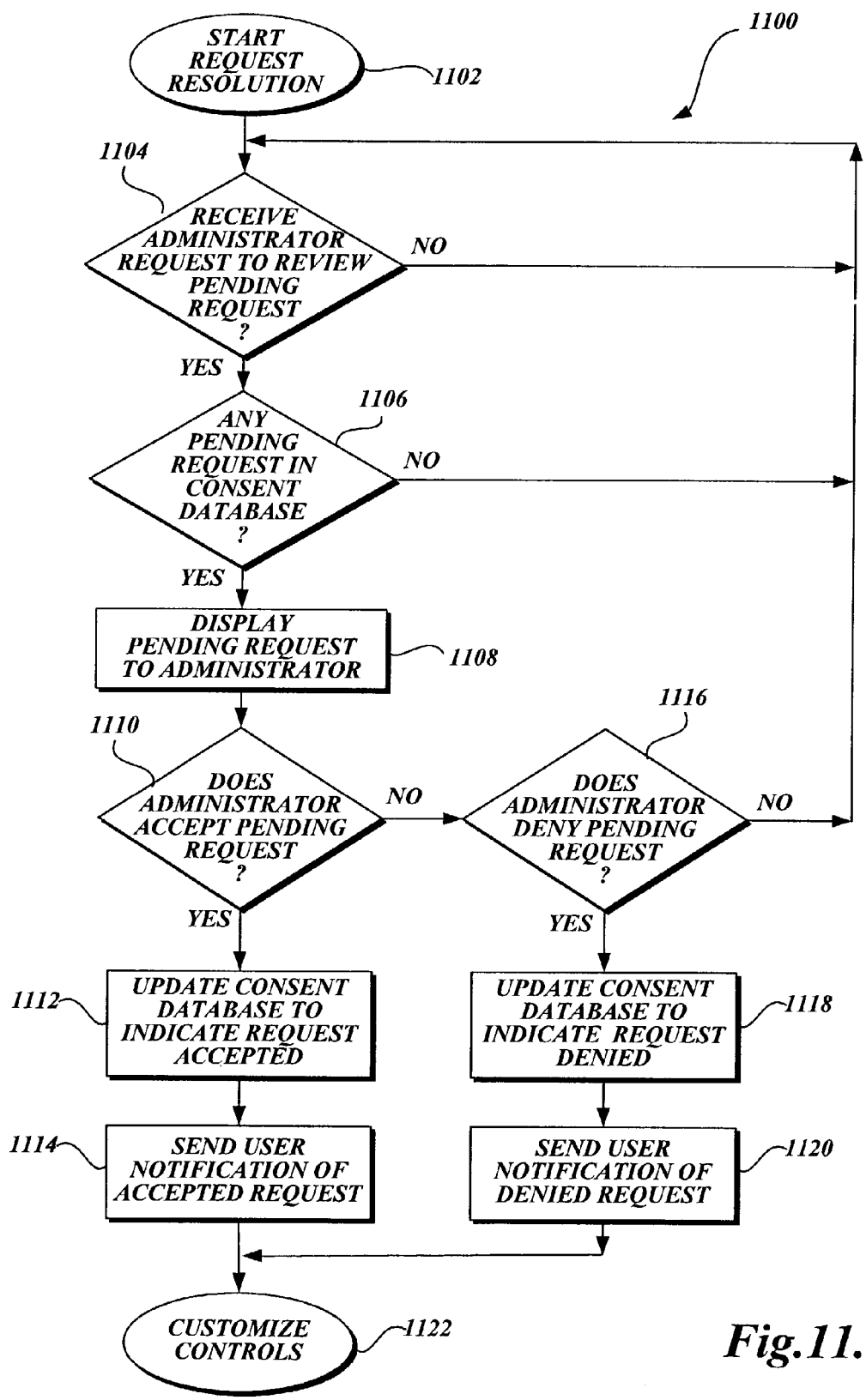
FIG. 11 is a flow diagram illustrating a request resolution routine formed in accordance with one exemplary embodiment of the present invention.

FIG. 11 illustrates routine 1100 for resolving a request in accordance with one embodiment of the present invention. Routine 1100 begins at block 1102 and proceeds to decision block 1104, where a test is made to determine whether or not a request from the administrator to review the pending request has been received. If at decision block 1104, it is determined that no request from the administrator was received, routine 1100 cycles back until decision block 1104 tests positive. If at decision block 1104, it is determined that a request from the administrator was received, routine 1100 proceeds to decision block 1106. At decision block 1106, a test is made to determine if the consent database 208 contains any pending request. If at decision block 1106, it is determined that there is no pending request in the consent database 208, routine 1100 cycles back to decision block 1104 and the above-described steps are repeated. If at decision block 1106, it is determined that there is a pending request in the consent database 208, routine 1100 proceeds to block 1108. At block 1108, routine 1100 displays the pending request information to the administrator.

After displaying the pending request to the administrator at block 1108, routine 1100 proceeds to decision block 1110 where a test is made to determine if the administrator accepts the pending request. If at decision block 1110, it is determined that the administrator accepted the pending request, routine 1100 proceeds to block 1112. At block 1112, routine 1100 updates the consent database 208 to indicate that the request was accepted. After updating the consent database 208 to indicate the request was accepted in block 1112, routine 1100 proceeds to block 1114. At block 1114, routine 1100 sends the user notification of the accepted request. Those of ordinary skill in the art will appreciate that notifications may be sent utilizing any of the various methods for exchanging messages over a network known in the art, such as e-mail and instant messaging. After sending the user notification of the accepted request at block 1114, routine 1100 proceeds to block 1122 to customize controls, which is described below with reference to FIG. 12. Alternatively, another embodiment of the present invention notifies the user of the resolved request when the user is detected logging on. In the alternative embodiment, the consent database 208 is queried for newly resolved requests, and the user is notified if any newly resolved request is found.

If at decision block 1110, it is determined that the administrator did not accept the pending request, routine 1100 proceeds to decision block 1116 where a test is made to determine if the administrator denies the pending request. If at decision block 1116, it is determined that the administrator did not deny the pending request, routine 1100 cycles back to decision block 1104 and the above described steps are repeated. If at decision block 1116, it is determined that the administrator denied the pending request, routine 1100 proceeds to block 1118 and updates the consent database 218 to indicate that the request was denied. After updating the consent database 208 to indicate that the request was denied, routine 1100 proceeds to block 1120. At block 1120, routine 1100 sends the user notification that the request was denied by the administrator. For example, the user may be sent an e-mail or instant message indicating that the request was denied. After sending the user notification of the denied request in block 1120, routine 1100 proceeds to block 1122 to customize controls. As described above, an alternative embodiment notifies the user of the resolved request when the user is detected logging on. After sending the user notification of the denied request in block 1120, routine 1100 proceeds to block 1122 to customize controls, which is described below with reference to FIG. 12.

Figure 12:
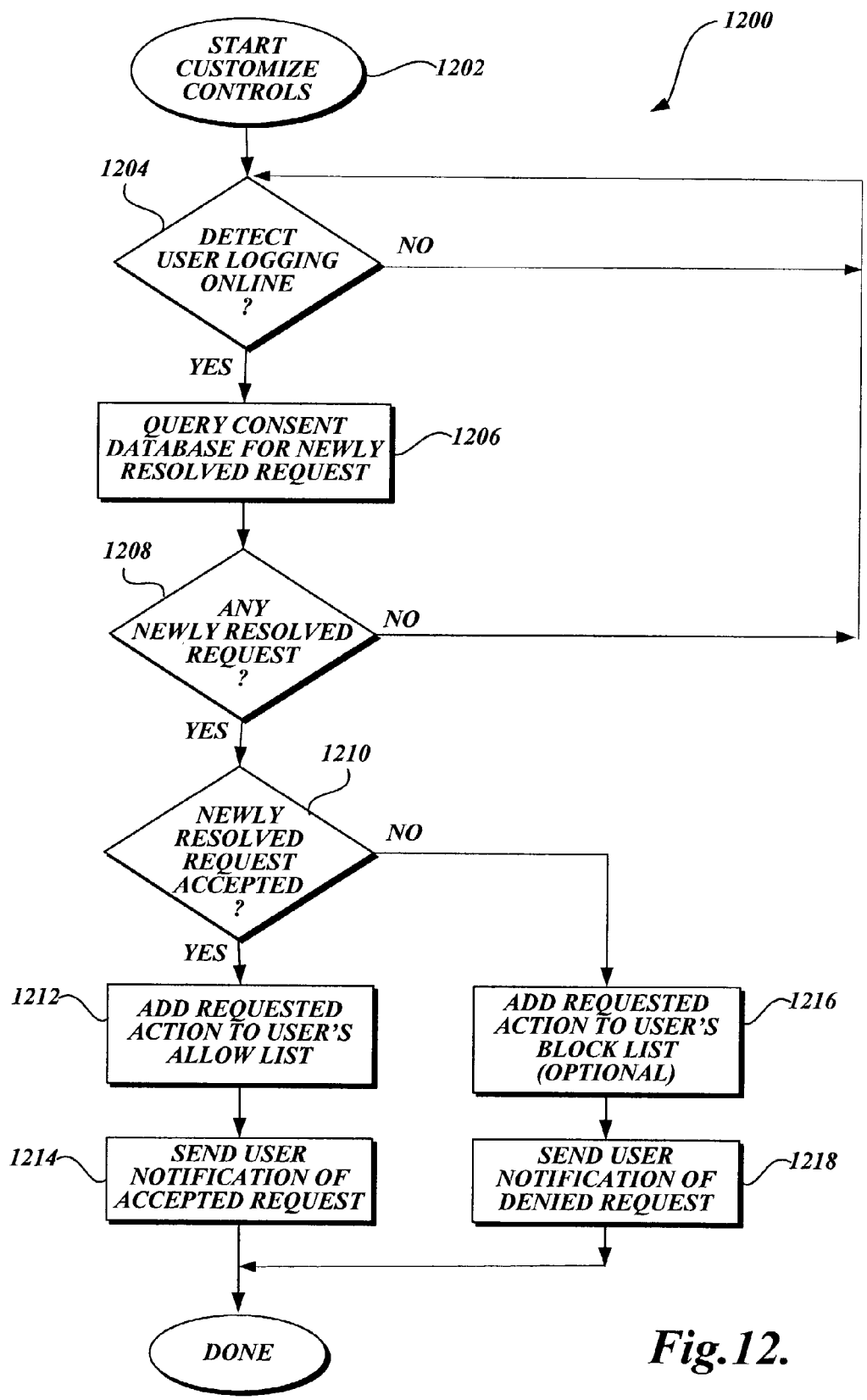
FIG. 12 is a flow diagram illustrating a routine for customizing controls formed in accordance with one exemplary embodiment of the present invention.

FIG. 12 illustrates routine 1200 for customizing controls in accordance with one embodiment of the present invention. Routine 1200 begins at block 1202 and proceeds to decision block 1204, where a test is made to determine if the user has been detected logging on. If at decision block 1204, the user was not detected logging on, routine 1200 cycles back until decision block 1204 tests positive. If at decision block 1204, a determination is made that the user was detected logging on, routine 1200 proceeds to block 1206. At block 1206, routine 1200 queries the consent database 208 for a newly resolved request. After querying the consent database 208 for a newly resolved request at block 1206, routine 1200 proceeds to decision block 1208. At decision block 1208, a test is made to determine if any newly resolved request was found in the consent database 208. If at decision block 1208, it is determined that no newly resolved request was found in the consent database 208, routine 1200 cycles back to decision block 1204 and the steps described above are repeated. If at decision block 1208, it is determined that a newly resolved request was found in consent database 208, routine 1200 proceeds to decision block 1210. At decision block 1210, a test is made to determine whether or not the newly resolved request was accepted by the administrator. If at decision block 1210, it is determined that the newly resolved request was accepted, routine 1200 proceeds to block 1212. At block 1212, the action associated with the newly resolved request is added to the user's allow list in the setting database 206. In different embodiments of the present invention, all or a portion of the user's allow list may be downloaded to the user's client machine. Downloading all or a portion of the user's allow list may enhance performance, as well as providing more effective controls at a lower level. By adding the action to the user's allow list, the present invention has customized the administrator controls used for filtering the user's online actions to allow the user to perform a previously blocked online action. After adding the action associated with the newly resolved request to the user's allow list at block 1212, routine 1200 proceeds to block 1214. At block 1214, routine 1200 sends the user notification of accepted request, which may be accomplished using e-mail, instant messaging, and any other conventional method of exchanging messages over a network. After notifying the user of the accepted request, routine 1200 is completed.

If, at decision block 1210, it is determined that the newly resolved request was not accepted, routine 1200 proceeds to block 1216. At block 1216, routine 1200 adds the requested action to the user's block list. An alternative embodiment of the present invention does not add the action associated with the denied request from the user to the user's block list if the user was already blocked from performing the action. After adding the requested action to the user's block list at block 1216, routine 1200 proceeds to block 1218. At block 1218, the user is sent notification that the request was denied and routine 1200 is completed.

Figure 13:
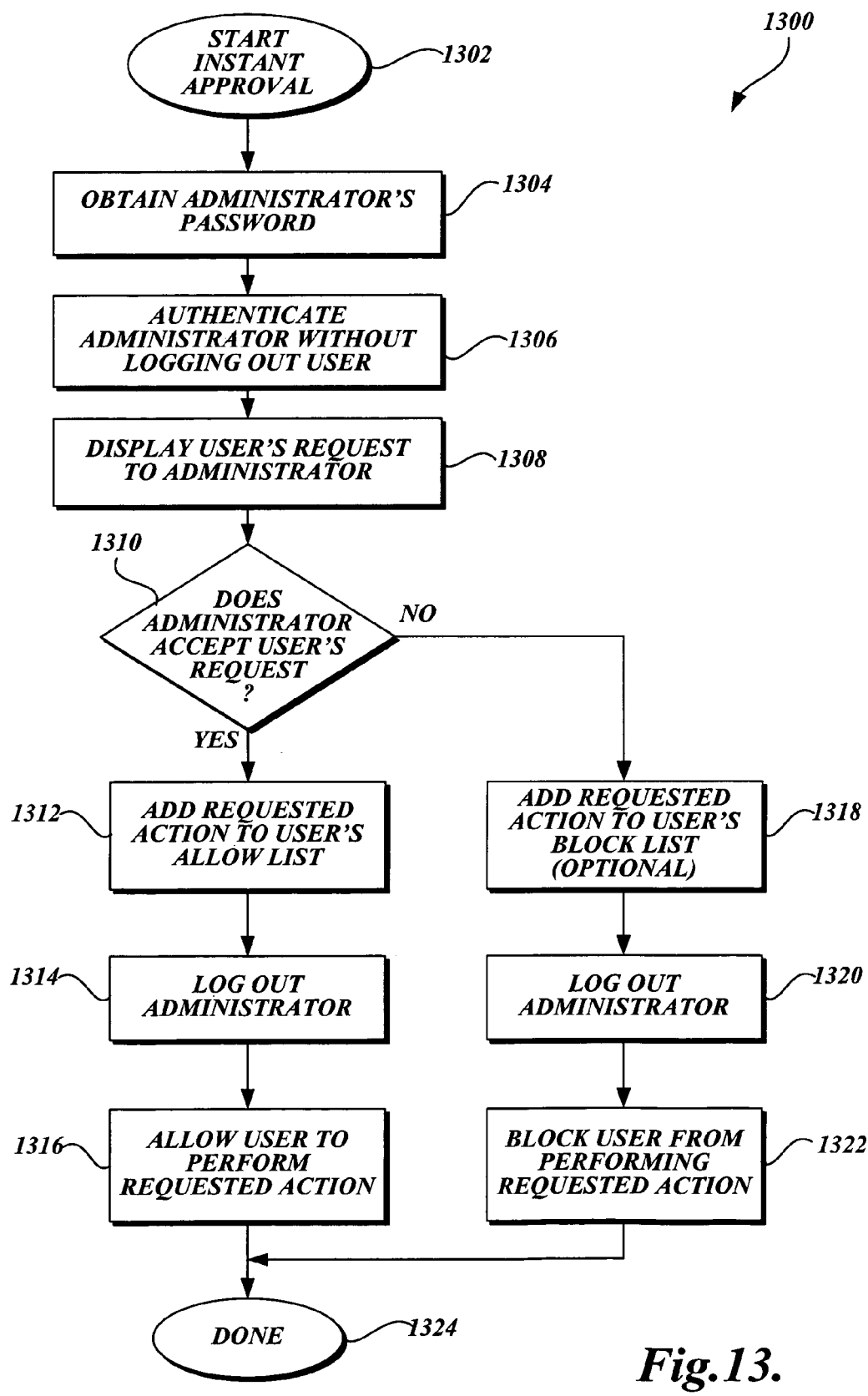
FIG. 13 is a flow diagram illustrating an instant approval routine formed in accordance with one exemplary embodiment of the present invention.

FIG. 13 illustrates a routine 1300 for providing instant approval in accordance with one embodiment of the present invention. As described above with reference to FIG. 9, the instant approval routine 1300 is performed when it has been determined that the user was blocked from performing an online action and the administrator is present. Routine 1300 starts at block 1302 and proceeds to block 1304, where the administrator's password is obtained. The password includes a string of characters entered by an administrator to verify his or her identity to the network. After obtaining the administrator's password in block 1304, routine 1300 proceeds to block 1306. At block 1306, routine 1300 authenticates the administrator without logging out the user. In one embodiment, routine 1300 authenticates the administrator by comparing the password against a stored list of authorized passwords and users and determining that the password is legitimate. After authenticating the administrator without logging out the user, routine 1300 proceeds to block 1308 where the user's request is displayed to the administrator. After displaying the user's request to the administrator in block 1308, routine 1300 proceeds to decision block 1310. In decision block 1310, a test is made to determine whether the administrator has accepted the user's request. If at decision block 1310, it is determined that the user's request was accepted by the administrator, routine 1300 proceeds to block 1312. At block 1312, the action associated with the accepted request is added to the user's allow list in the setting database 206. In different embodiments of the present invention, all or a portion of the user's allow/block list may be downloaded to the user's client computer. Downloading all or part of the user's allow/block list may enhance performance, as well as providing more effective controls at a lower level on the user's client computer. By adding the requested action to the user's allow list, the administrator customizes the user's online actions filter to allow the user to perform a previously blocked online action. After, adding the requested action to the user's allow list, routine 1300 proceeds to block 1314, where the administrator is logged out. After logging out the administrator at block 1314, routine 1300 proceeds to block 1316 and the user is allowed to perform the previously blocked action for which the user requested instant approval. After allowing the user to perform the requested online action at block 1316, instant approval routine 1300 is completed at block 1324.

If at decision block 1310, it is determined that the administrator did not accept the user's request, routine 1300 proceeds to block 1318. At block 1318, routine 1300 adds a requested action to the user's block list. An alternative embodiment of the present invention does not add the action associated with the denied request from the user to the user's block list if the user was already blocked from performing the action. As described above, other embodiments of the present invention download all or a portion of the user's allow/block list to the user's client computer. Downloading all or part of the user's allow/block list may enhance performance and provide more effective controls at a lower level on the user's client computer. After adding the requested action to the user's block list in block 1318, routine 1300 proceeds to block 1320, where the administrator is logged out. After logging out the administrator at block 1320, routine 1300 proceeds to block 1322, where the user is blocked from performing the requested action. Routine 1300 is completed at block 1324.

Figure 14:
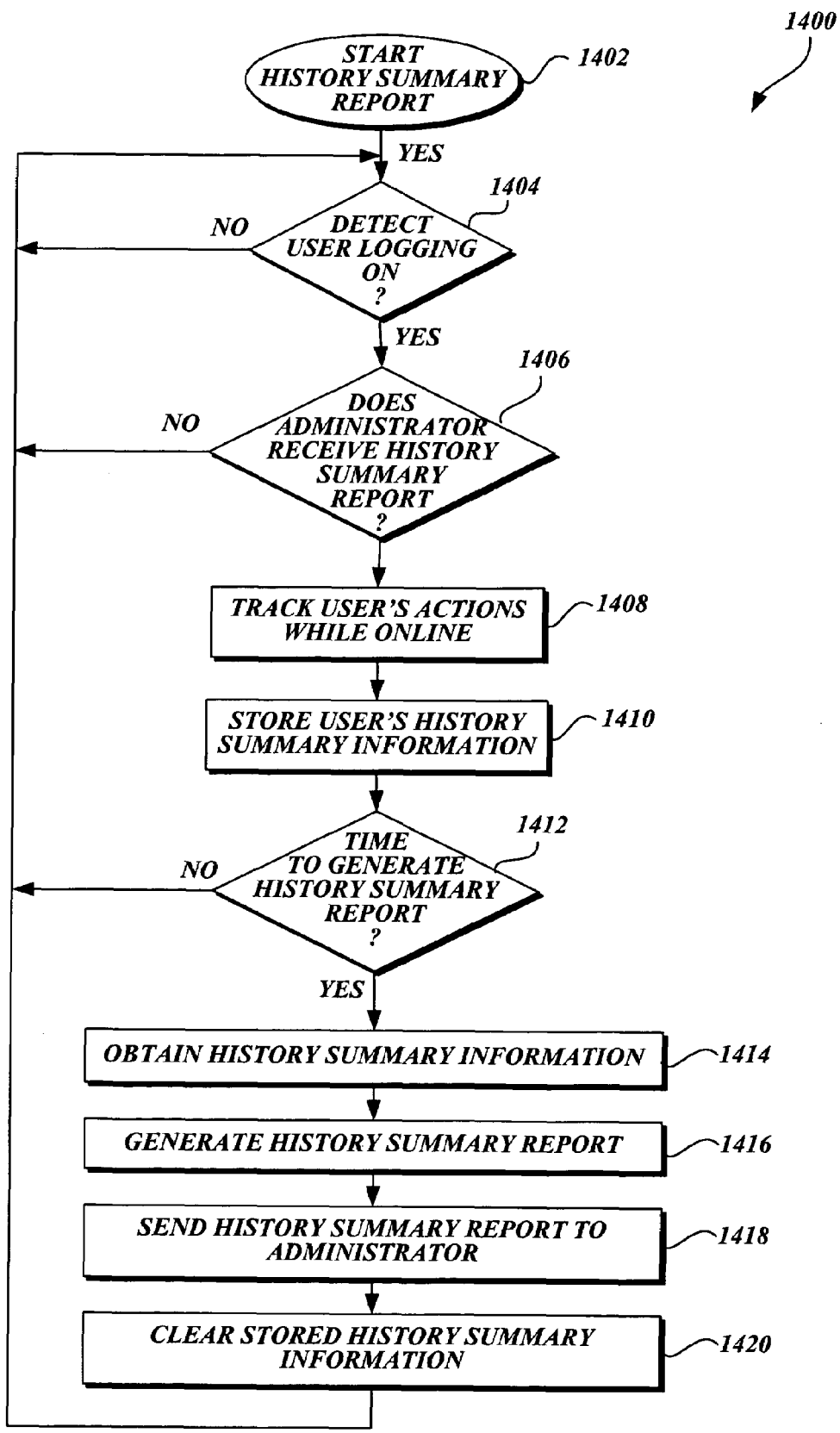
FIG. 14 is a flow diagram illustrating a history summary report routine formed in accordance with one exemplary embodiment of the present invention.

FIG. 14 illustrates a routine 1400 for generating a history summary report in accordance with one embodiment of the present invention. Routine 1400 begins at block 1402 and proceeds to decision block 1404, where a test is made to determine if the user has been detected logging on. If at decision block 1404, the user is not detected logging on, routine 1400 cycles back until decision block 1404 tests positive. If at decision block 1404, a determination is made that the user was detected logging on, routine 1400 proceeds to block 1406. At decision block 1406, a test is made to determine if the administrator is to receive the history summary report. In one embodiment of the present invention, the parental controls settings in the setting database 206 indicate whether or not the administrator wishes to receive a history summary report. Those of ordinary skill in the art will appreciate that there are many ways to determine if the administrator requests receiving a history summary report. For example, the administrator may be queried as to whether or not the administrator wishes to receive a history summary report.

If at decision block 1406, it is determined that the administrator is not to receive the history summary report, routine 1400 cycles back to decision block 1404 and the above described steps are repeated. If at decision block 1406, it is determined that the administrator is to receive the history summary report, routine 1400 proceeds to block 1408. At block 1408, routine 1400 tracks the user's actions while the user is online. After tracking the user's online actions at block 1408, routine 1400 proceeds to block 1410 where the user's history summary information is stored. After storing the user's history summary information at block 1410, routine 1400 proceeds to decision block 1412.

At decision block 1412, a test is made to determine if it is time to generate the history summary report. In one embodiment of the present invention, the history summary report is generated periodically. In another embodiment, the history summary report is generated when it has been seven days or more since the last history summary report was generated. If at decision block 1412, it is determined that it is not time to generate the history summary report, routine 1400 cycles back to decision block 1404 and the steps described above are repeated. If at decision block 1412, it is determined to be time to generate the history summary report, routine 1400 proceeds to block 1414 and obtains stored history summary information. After obtaining the history summary information at block 1414, routine 1400 proceeds to block 1416 and generates the history summary report.

Figure 17:
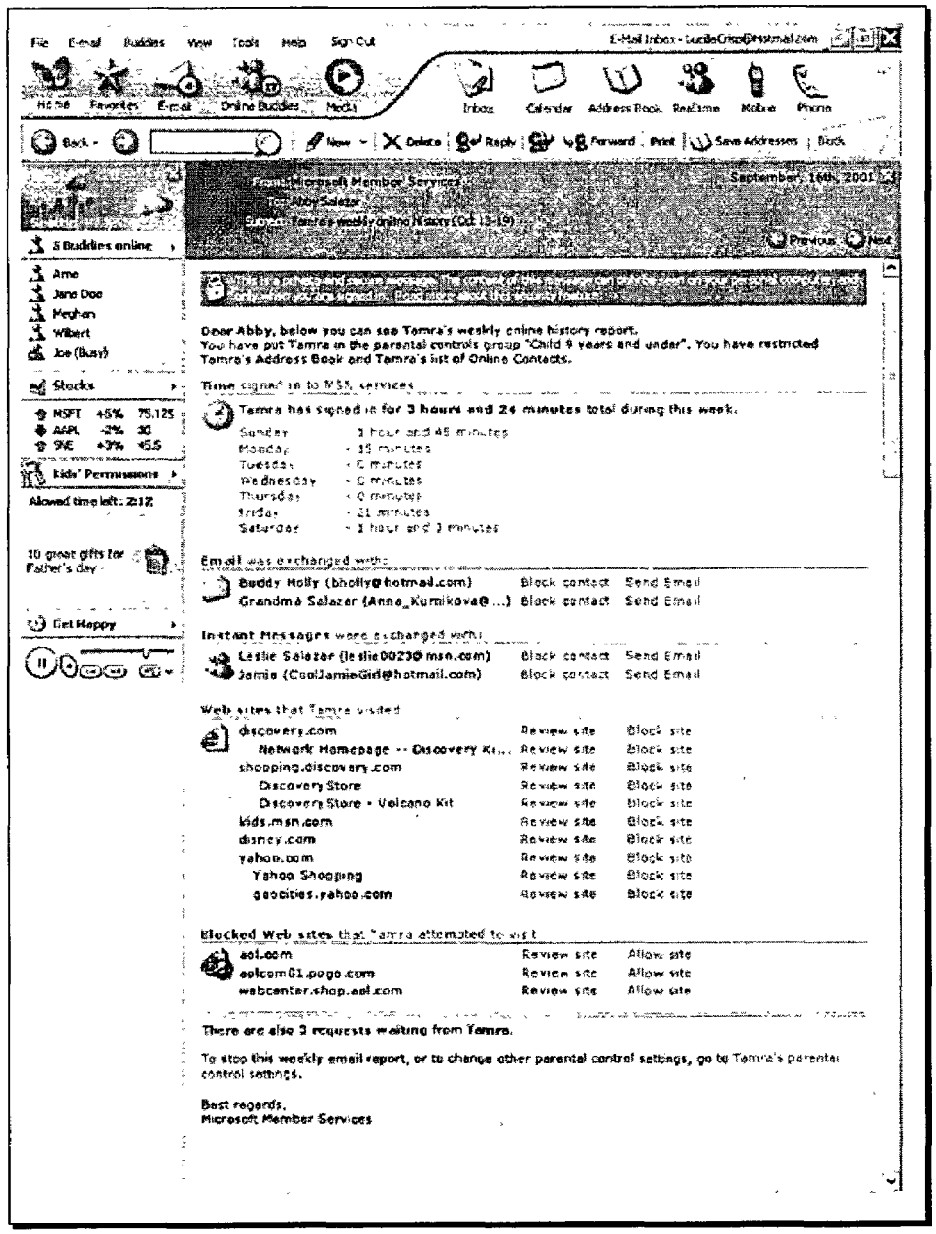
FIG. 17 is a screen diagram showing an illustrative screen display of the history summary report in accordance with one exemplary embodiment of the present invention.

FIG. 17 is a screen diagram illustrating an exemplary history summary report implemented as a Web page using a markup language, such as hypertext markup language (html) and extensible Markup Language ("XML"). Those of ordinary skill in the art will appreciate that the present invention may be practiced using any conventional methods for generating and presenting reports without varying from the scope of the present invention.

Returning to FIG. 14, after generating the history summary report at block 1416, routine 1400 proceeds to block 1418. At block 1418, the history summary report is sent to the administrator. After sending the history summary report to the administrator in block 1418, routine 1400 proceeds to block 1420 and clears the stored history summary information. After clearing the stored history information at block 1420, routine 1400 cycles back to decision block 1404 and the above-described steps are repeated.

Figure 15:
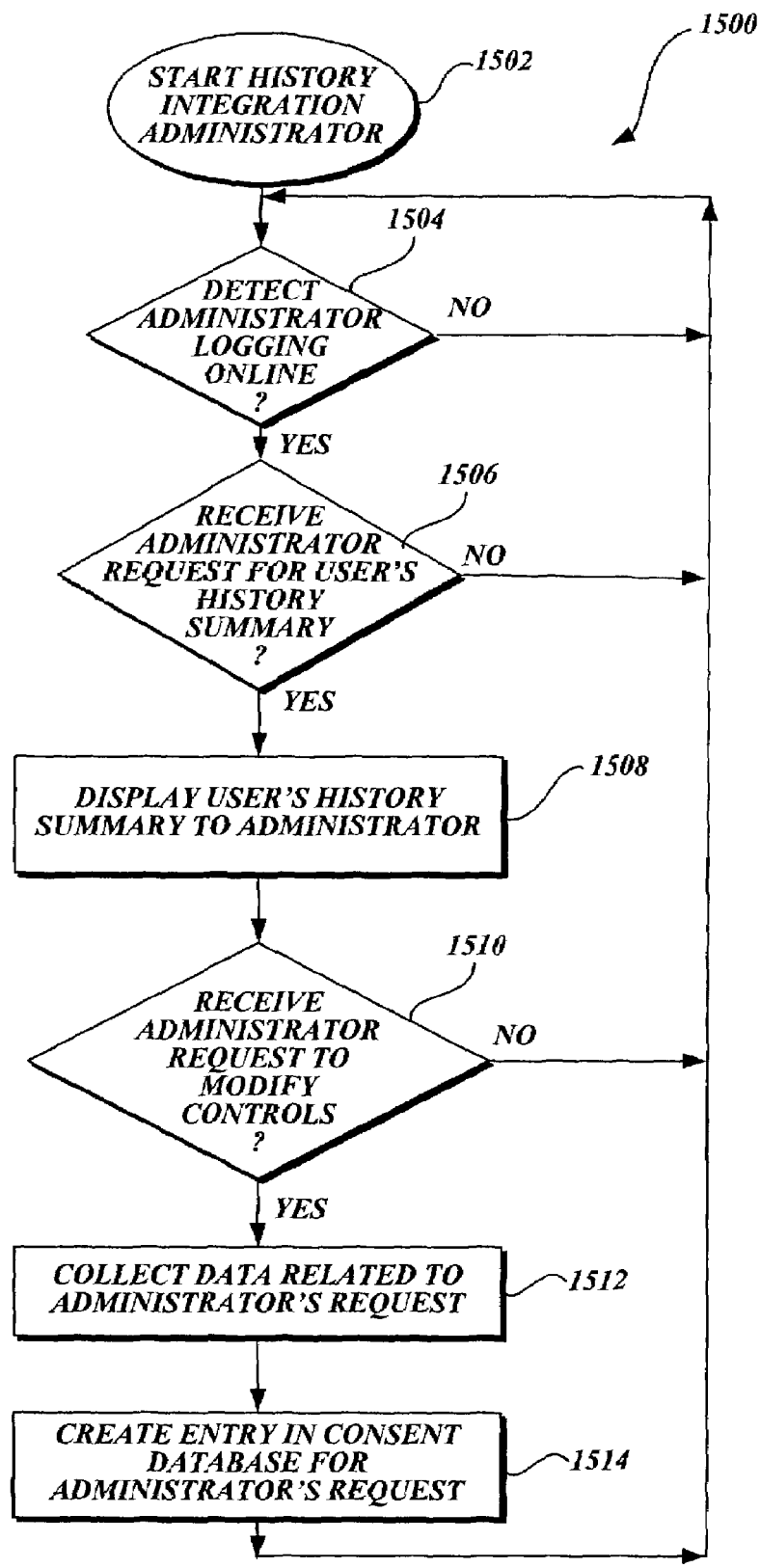
FIGS. 15 and 16 are flow diagrams illustrating a history integration routine formed in accordance with one exemplary embodiment of the present invention.
Figure 16:
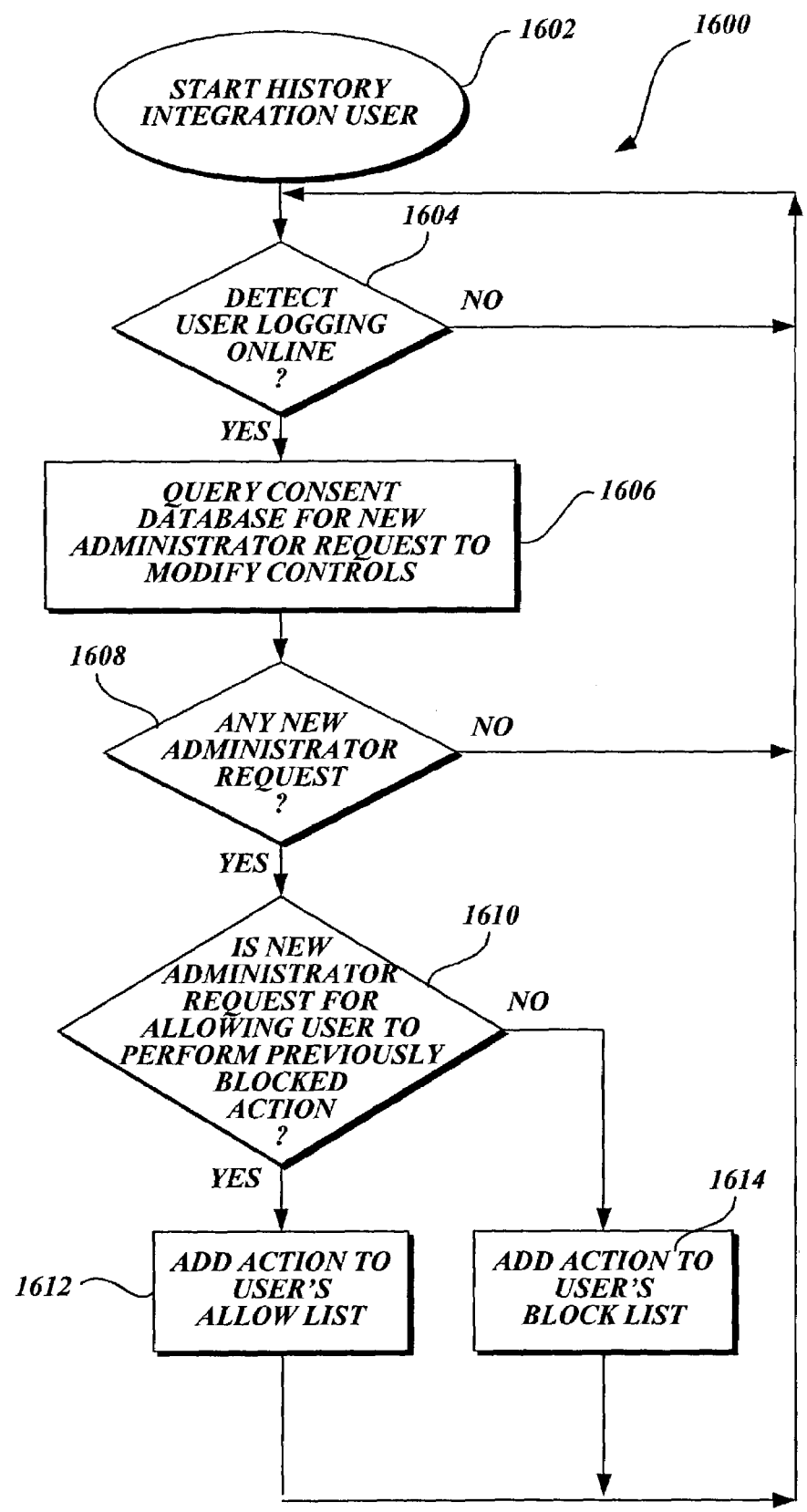

FIGS. 15 and 16 illustrate the history integration routines 1500 and 1600 in accordance with one embodiment of the present invention. Generally described, the history integration feature of the present invention enables the administrator to review the user's online history to determine if the controls need to be modified. For example, if in reviewing the user's online history information, the administrator determines that the user was allowed to take an inappropriate action, the administrator can customize the controls to block the user from performing inappropriate action in the future using the history integration feature of the present invention. In one embodiment of the present invention, the administrator is provided history summary information that includes an option for reviewing an online action included in the history summary information. For example, the administrator can select the option to visit a Web site included in the history summary information.

FIG. 15 illustrates the portion of the history integration feature with which the administrator interacts. FIG. 15 illustrates a routine 1500, which starts at block 1502 and proceeds to decision block 1504, where a test is made to determine if the administrator has been detected logging on. If at decision block 1504, it is determined that the administrator has not been detected logging on, routine 1500 cycles back until decision block 1504 tests positive. If at decision block 1504, it is determined that the administrator was detected logging on, routine 1500 proceeds to decision block 1506. At decision block 1506, a test is made to determine if the administrator has requested the user's history summary information. If, at decision block 1506 it is determined that the administrator has not requested the user's history summary information, routine 1500 cycles back to decision block 1504 and the above-described steps are repeated. If, at decision block 1506, it is determined that the administrator has requested the user's history summary, routine 1500 proceeds to block 1508 and displays the user's history summary information to the administrator.

After displaying the user's history summary information to the administrator at block 1508, routine 1500 proceeds to decision block 1510. At decision block 1510, a test is made to determine if a request has been received from the administrator to modify the controls that filter the user's online actions. If at decision block 1510, it is determined that the administrator does not wish to modify the controls, routine 1500 cycles back to decision block 1504 and the above-described steps are repeated. If at decision block 1510, it is determined that a request has been received from the administrator to modify the controls, routine 1500 proceeds to block 1512. At block 1512, routine 1500 collects data related to the administrator's request. After collecting data related to the administrator's request at block 1512, routine 1500 proceeds to block 1514. At block 1514, routine 1500 creates an entry in the consent database 208 that responds to the administrator's request. After creating the entry in the consent database 208 that responds to the administrator's request at block 1514, routine 1500 cycles back to decision block 1504 and the above-described steps are repeated.

FIG. 16 illustrates the portion of the history integration feature that updates the user's allow or block list. FIG. 16 illustrates a routine 1600, which starts at block 1602 and proceeds to decision block 1604, where a test is made to determine if the user has been detected logging on. If at decision block 1604, it is determined that the user was not detected logging on, routine 1600 cycles back until decision block 1604 tests positive. If at decision block 1604, the user is detected logging on, routine 1600 proceeds to block 1606. At block 1606, routine 1600 queries the consent database 208 for a new administrator request to modify the controls that filter the user's online actions.

After querying the consent database 208 for a new administrator request at block 1606, routine 1600 proceeds to decision block 1608. At decision block 1608, a test is made to determine if any new administrator requests were found in the consent database 208. If at decision block 1608, it is determined that no new administrative request was found in the consent database 208, routine 1600 cycles back to decision block 1604 and the above-described steps are repeated. If at decision block 1608, it is determined that a new administrator request was found in the consent database 208, routine 1600 proceeds to decision block 1610. At decision block 1610, a test is made to determine if the new administrator request is for allowing the user to perform a previously blocked action.

If at decision block 1610, it is determined that the new administrator request is to allow the user to perform a previously blocked action, routine 1600 proceeds to block 1612. At block 1612, routine 1600 adds the action associated with the administrator's request to the user's allow list. In other embodiments of the present invention, all or a portion of the user's allow list is downloaded to the user's client computer for improved performance and more effective control at a lower level on the user's client computer. By adding the action to the user's allow list, the user's controls are customized to allow the user to perform the previously blocked action. After adding the action to the user's allow list at block 1612, routine 1600 cycles back to decision block 1604 and the above-described steps are repeated.

If at decision block 1610, it is determined that the new administrator request was not for allowing the user to perform a previously blocked action, routine 1600 proceeds to block 1614. At block 1614, the action associated with the administrator request is added to the user's block list. By adding the action to the user's block list, the controls for filtering the user's online actions are customized to not allow the user to perform an action that was previously allowed, as indicated in the history summary information displayed to the administrator. After adding the action to the user's block list in block 1614, the user will no longer be allowed to perform the online action associated with the administrator's request. After adding the action associated with the administrators request to the user's block list, routine 1600 cycles back to decision block 1604 and the above-described steps are repeated.

While the above description of the present invention has been described as a interactions between a child user and a parent administrator of a network, the present invention is not limited to any specific user and administrator relationship. For example, the relationship can be an employee and employer relationship. The parental control system provides the advantages of enabling an administrator (parent/employer) and user (child/employee) to interactively customize the controls that are used for filtering the user's actions across a network.

With reference once again to FIG. 2, in an alternative embodiment of the present invention, the components of the parental controls system may be implemented as distributed software components accessible via the communication network 100. An example of a distributed application development and execution platform is the Microsoft® .NET platform from Microsoft Corporation of Redmond, Wash. Generally described, the Microsoft .NET platform is an application programming and execution platform that provides write-once, compile-once, run-anywhere application development. Microsoft .NET platform applications may be created in any language as long as they are compiled by a compiler that targets the Microsoft .NET universal runtime ("URT"), also known as the common language runtime engine. Such a compiler compiles .NET applications into intermediate language ("IL"), rather than directly into executable code.

To execute a .NET platform application, the compiled IL is interpreted, or "just-in-time" compiled, by the URT into native machine instructions. The native machine instructions can then be directly executed by the CPU. The Microsoft .NET platform also includes a base library that comprises a large set of class libraries and services. These libraries and services provide access to the features of the URT, and other high-level services, so that software developers do not have to code the same services repeatedly. Although the present invention may be applicable with regard to a .NET platform implementation, the present invention may also be implemented in alternative platform environments.

While the illustrative embodiments of the invention have been illustrated and described, it will be appreciated that various changes can be made therein without departing from the spirit and scope of the invention. For example, one skilled in relevant art will appreciate that the parental control system may incorporate interfaces conforming to the simple object access protocol ("SOAP") and the like. All such claims are considered to be within the scope of the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implementable method for enabling a user and an administrator simultaneously logged onto a network via separate network access devices to interactively customize administrator controls used to filter the user's online actions, comprising:

in response to receiving a user request from the user logged onto the network via a user network access device to perform a blocked online action, immediately and automatically, without further user input, providing information about the user request to the administrator simultaneously logged onto the network via an administrator network access device separate from the user network access device; and in response to receiving request resolution information from the administrator network access device, immediately updating administrator controls used to filter the user's online actions in accordance with the request resolution information, the administrator controls including a list of allowed online actions and a list of blocked online actions, and immediately transmitting the request resolution information automatically and without further user input to the user network access device.

2. The method of claim 1, wherein the user request to perform the blocked online action includes detecting that the user has been blocked from performing an online action and, in response to detecting that the user has been blocked from performing the online action, prompting the user to submit the request.

3. The method of claim 1, wherein the blocked online action is one of:

(a) visiting a Web site;
(b) adding a new entry to an electronic mail address book;
(c) adding a new entry to a Messenger Buddy list;
(d) downloading a file;
(e) having more time online;
(f) running an application;
(g) installing an application;
(h) viewing a movie;
(i) playing a game; and
(j) accessing a shared resource.

4. The method of claim 3, further comprising, prior to receiving a request for having more time online:

determining that the user's allowed time online is about to expire;
notifying the user that the allowed time online is about to expire; and
prompting the user to submit a request for more time online.

5. The method of claim 1, wherein information about the user request is provided to the administrator network access device by electronic mail.

6. The method of claim 1, wherein information about the user request is provided to the administrator network access device by instant messaging.

7. The method of claim 1, wherein the information provided to the administrator network access device about the user request comprises providing an element linked to a Web site; and wherein:
in response to clicking on the element linked to the Web site, navigating to the Web site; and
displaying information about the user request.

8. The method of claim 1, wherein providing the administrator network access device with information about the user request includes providing an option for resolving the user request.

9. The method of claim 1, wherein providing the information about the user request to the administrator network access device includes providing an option for reviewing the blocked online action associated with the user request.

10. The method of claim 9, wherein providing the information about the user request to the administrator network access device further includes:
detecting that the administrator network access device is logged onto the network;
searching the consent database for a pending request from the user; and
if a pending request from the user is found, automatically providing, without any administrator input, the administrator network access device with information about the pending request from the consent database.

11. The method of claim 1, further comprising storing the user request in a consent database.

12. The method of claim 11, wherein the consent database resides on the network.

13. The method of claim 11, wherein storing the user request includes obtaining and storing information about the user request.

14. The method of claim 13, wherein the information about the user request includes:
request identification;
user identification;
administrator identification;
information about the blocked online action;
address information for a resource on the network associated with the blocked online action; and
request status information.

15. The method of claim 13, further comprising updating the consent database in accordance with the request resolution information.

16. The method of claim 15, wherein the request resolution information includes an indication that the user request is accepted and the consent database is updated to indicate that the user request is accepted.

17. The method of claim 15, wherein the request resolution information includes an indication that the user request is denied and the consent database is updated to indicate that the user request is denied.

18. The method of claim 15, further comprising, after updating the consent database in accordance with the request resolution information, providing a notification to the user network access device.

19. The method of claim 18, wherein the notification is provided to the user network access device by electronic mail.

20. The method of claim 18, wherein the notification is provided to the user network access device by instant messaging.

21. The method of claim 18, wherein providing the notification to the user network access device further comprises:
detecting that the user network access device is logged onto the network;
searching the consent database for a resolved user request; and
if a resolved user request is found in the consent database, obtaining information about the resolved user request and providing, without any user input, the information about the resolved user request to the user network access device.

22. The method of claim 1, wherein the administrator controls used to filter the user's online actions are included in a setting database.

23. The method of claim 22, wherein updating the administrator controls used to filter the user's online actions further comprises:
detecting that the user network access device is logged onto the network;
searching the setting database for an updated administrator control; and
if an updated administrator control is found in the setting database, downloading at least a portion of the administrator controls to the user network access device.

24. The method of claim 1, wherein the request resolution information includes an indication that the user request is accepted and wherein the blocked online action is added to the list of allowed online actions.

25. The method of claim 1, wherein the request resolution information includes an indication that the user request is denied and wherein the blocked online action is added to the list of blocked online actions.

26. The method of claim 1, wherein the user is the administrator's child.

27. A computer-implementable method for enabling a user and an administrator simultaneously logged onto a network via separate network access devices to interactively customize administrator controls used to filter the user's online actions, comprising:
in response to receiving a request from the user logged onto the network via a user network access device to perform a blocked online action, determining if the administrator is simultaneously logged onto the network via an administrator network access device separate from the user network access device;
if the administrator is simultaneously logged onto the network, receiving from the administrator network access device an administrator identification;
in response to receiving the administrator identification, authenticating the administrator simultaneously logged on the network while continuing to allow the user access to the network;
after authenticating the administrator, immediately and automatically, without further user input, presenting the request from the user to perform the blocked online action to the administrator network access device and determining if the administrator accepts the request from the user to perform the blocked online action; and
if the administrator accepts the request from the user to perform the blocked online action, immediately updating administrator controls used to filter the user's online action to allow the blocked online action, and immediately transmitting the acceptance of the request automatically and without further user input to the user network access device.

28. The method of claim 27, further comprising allowing the user to perform the blocked online action.

29. The method of claim 27, wherein the blocked online action is one of:
 (a) visiting a Web site;
 (b) adding a new entry to an electronic mail address book;
 (c) adding a new entry to a Messenger Buddy list;
 (d) downloading a file;
 (e) having more time online;
 (f) running an application;
 (g) installing an application;
 (h) viewing a movie;
 (i) playing a game; and
 (j) accessing a shared resource.

30. The method of claim 29, further comprising, prior to receiving a request for having more time online:
 determining that an amount of time the user is allowed online is about to expire;
 notifying the user that the amount of time the user is allowed online is about to expire; and
 receiving a request from the user for more time online.

31. The method of claim 27, wherein the user is the administrator's child.

32. A computer-readable storage medium having computer-executable instructions for enabling a user and an administrator simultaneously logged onto a network via separate network access devices to interactively customize administrator controls used to filter the user's online actions, the instructions when executed perform a process comprising:
 (a) in response to receiving a user request from the user logged onto the network via a user network access device to perform a blocked online action, immediately and automatically, without further user input, providing information about the user request to the administrator simultaneously logged onto the network via an administrator network access device separate from the user network access device; and
 (b) in response to receiving request resolution information from the administrator network access device, immediately updating administrator controls used to filter the user's online actions in accordance with the request resolution information, the administrator controls including a list of allowed online actions and a list of blocked online actions, and immediately transmitting the request resolution information automatically and without further user input to the user network access device.

33. The computer-readable storage medium of claim 32, wherein receiving the user request to perform the blocked online action includes detecting that the user has been blocked from performing an online action and, in response to detecting that the user has been blocked from performing the online action, prompting the user to submit the request.

34. The computer-readable storage medium of claim 32, wherein the blocked online action is one of:
 (a) visiting a Web site;
 (b) adding a new entry to an electronic mail address book;
 (c) adding a new entry to a Messenger Buddy list;
 (d) downloading a file;
 (e) having more time online;
 (f) running an application;
 (g) installing an application;
 (h) viewing a movie;
 (i) playing a game; and
 (j) accessing a shared resource.

35. The computer-readable storage medium of claim 32, wherein providing the administrator network access device with information about the user request comprises:
 providing an element linked to a Web site;
 in response to the administrator clicking on the element linked to the Web site, navigating to the Web site; and
 displaying information about the user request.

36. The computer-readable storage medium of claim 32, wherein providing the administrator network access device with information about the user request includes providing an option for resolving the user request.

37. The computer-readable storage medium of claim 32, wherein providing the administrator network access device with information about the user request includes providing an option for reviewing the blocked online action associated with the user request.

38. The computer-readable storage medium of claim 37, wherein providing the administration network access device with information about the user request further includes:
 detecting that the administrator network access device is logged onto the network;
 searching the consent database for a pending request from the user; and
 if a pending request from the user is found, automatically providing, without any administrator input, the administrator network access device with information about the pending request from the consent database.

39. The computer-readable storage medium of claim 32, further comprising storing the user request in a consent database.

40. The computer-readable storage medium of claim 39, wherein the consent database resides on the network.

41. The computer-readable storage medium of claim 39, wherein storing the user request in the consent database includes obtaining information about the user request.

42. The computer-readable storage medium of claim 41, further comprising updating the consent database in accordance with the request resolution information.

43. The computer-readable storage medium of claim 42, wherein the request resolution information includes an indication that the user request is accepted and the consent database is updated to indicate that the user request is accepted.

44. The computer-readable storage medium of claim 42, wherein the request resolution information includes an indication that the user request is denied and the consent database is updated to indicate that the user request is denied.

45. The computer-readable storage medium of claim 42, further comprising, after updating the consent database in accordance with the request resolution information, responding to the received request resolution from the administrator network access device by providing a notification to the user network access device.

46. The computer-readable storage medium of claim 45, wherein providing the notification to the user network access device comprises:
 detecting that the user network access device is logged onto the network;
 searching the consent database for a resolved user request; and if a resolved user request is found in the consent database, obtaining information about the resolved user request and providing, without any user input, the information about the resolved user request to the user network access device.

47. The computer-readable storage medium of claim 32, wherein the administrator controls used to filter the user's online actions are included in a setting database.

48. The computer-readable storage medium of claim 47, wherein updating administrator controls used to filter the user's online actions comprises:
    detecting that the user network access device is logged onto the network;
    searching the setting database for an updated administrator control; and
    if an updated administrator control is found in the setting database, downloading at least a portion of the administrator controls to the user network access device.

49. The computer-readable storage medium of claim 32, wherein the request resolution information includes an indication that the user request is accepted and wherein the blocked online action is added to the list of allowed online actions.

50. The computer-readable storage medium of claim 32, wherein the request resolution information includes an indication that the user request is denied and wherein the blocked online action is added to the list of blocked online actions.

51. The computer-readable storage medium of claim 32, wherein the user is the administrator's child.

52. A computer-readable storage medium having computer-executable instructions for enabling a user and an administrator simultaneously logged onto a network via separate network access devices to interactively customize administrator controls used to filter the user's online actions, the instructions when executed perform a process comprising, in response to receiving a request from the user logged onto the network via a user network access device to perform a blocked online action:
    (a) determining if the administrator is simultaneously logged onto the network via an administrator network access device separate from the user network access device; and
    (b) if the administrator is simultaneously logged onto the network:
        (i) in response to receiving the administrator's identification, authenticating the administrator simultaneously logged onto the network while continuing to allow the user access to the network;
        (ii) after authenticating the administrator, immediately and automatically, without further user input, presenting the request from the user to perform the blocked online action to the administrator network access device and determining if the administrator accepts the request from the user to perform the blocked online action; and
        (iii) if the administrator accepts the request from the user to perform the blocked online action, immediately updating administrator controls used to filter the user's online actions to allow the blocked online action, and immediately transmitting the acceptance of the request automatically and without further user input to the user network access device.

53. The computer-readable storage medium of claim 52, wherein the instructions when executed also allow the user to perform the blocked online action.

54. The computer-readable storage medium of claim 52, wherein the blocked online action is one of:
    (a) visiting a Web site;
    (b) adding a new entry to an electronic mail address book;
    (c) adding a new entry to a Messenger Buddy list;
    (d) downloading a file;
    (e) having more time online;
    (f) running an application;
    (g) installing an application;
    (h) viewing a movie;
    (i) playing a game; and
    (j) accessing a shared resource.

55. A computer system for enabling a user and an administrator simultaneously logged onto a network via separate network access devices to interactively customize administrator controls used to filter the user's online actions, the computer system comprising:
    (a) a setting database component for storing the administrator controls used to filter the user's online actions, administrator controls including a list of allowed online actions and a list of blocked online actions; and
    (b) an administrator control component for:
        (i) receiving a user request from the user logged onto the network via a user network access device to perform a blocked online action;
        (ii) immediately and automatically, without further user input, providing information about the user request to the administrator simultaneously logged onto the network via an administrator network access device separate from the user network access device;
        (iii) receiving request resolution information from the administrator network access device;
        (iv) immediately updating the administrator controls used to filter the user's online actions stored in the setting database in accordance with the request resolution information; and
        (v) immediately transmitting the request resolution information automatically and without further user input to the user network access device.

56. The system of claim 55, wherein the user request to perform the blocked online action includes detecting that the user has been blocked from performing an online action and, in response to detecting that the user has been blocked from performing the online action, prompting the user to submit the request.

57. The system of claim 55, wherein providing information to the administrator about the user request comprises:
    providing an element linked to a Web site;
    in response to the administrator clicking on the linked element, navigating to the Web site; and
    displaying information about the user request.

58. The system of claim 55, wherein providing the administrator network access device with information about the user request includes providing an option for reviewing the blocked online action associated with the user request.

59. The system of claim 55, further comprising:
    a consent database component for storing information about a user request to perform a blocked online action, wherein the administrator control component also stores the user request in the consent database.

60. The system of claim 59, wherein providing information about the user request includes:
    detecting that the administrator network access device is logged onto the network;
    searching the consent database for a pending request from the user; and if a pending request from the user is found, automatically, without further administrator input, providing the administrator network access device with information about the pending request from the consent database.

61. The system of claim 59, wherein the administrator control component also updates the consent database with the request resolution information.

62. The system of claim 61, wherein the request resolution information includes an indication that the user request is accepted and the consent database is updated to indicate that the user request is accepted.

63. The system of claim 61, wherein the request resolution information includes an indication that the user request is denied and the consent database is updated to indicate that the user request is denied.

64. The system of claim 61, further comprising, after updating the consent database in accordance with the request resolution information, providing a notification to the user network access device.

65. The system of claim 61, wherein providing the notification to the user network access device includes:
   detecting that the user network access device is logged onto the network;
   searching the consent database for a resolved user request; and
   if a resolved user request is found in the consent database, obtaining information about the resolved user request and providing, without any user input, the information about the resolved user request to the user network access device.

66. The system of claim 61, wherein updating the administrator controls used to filter the user's online actions stored in the setting database further comprises:
   detecting that the user network access device is logged onto the network;
   searching the setting database for an updated administrator control; and
   if an updated administrator control is found in the setting database, downloading at least a portion of the administrator controls to the user network access device.

67. The system of claim 55, wherein the request resolution information includes an indication that the user request is accepted and the administrator control component adds the blocked online action to the list of allowed actions.

68. The system of claim 55, wherein the request resolution information includes an indication that the user request is denied and the administrator control component adds the blocked online action to the list of blocked actions.

69. A computer system for enabling a user and an administrator simultaneously logged onto a network to interactively customize administrator controls used to filter the user's online actions, the computer system comprising:
   a setting database component for storing the administrator controls used to filter the user's online actions, the administrator controls including a list of allowed online actions and a list of blocked online actions; and
   an administrator control component for:
      receiving a request from the user logged onto the network via a user network access device to perform a blocked online action;
      determining if the administrator is simultaneously logged onto the network via an administrator network access device separate from the user network access device;
      if the administrator is simultaneously logged onto the network, receiving the administrator's identification;
      in response to receiving the administrator's identification, authenticating the administrator simultaneously logged onto the network while continuing to allow the user access to the network;
      after authenticating the administrator, immediately and automatically, without further user input, presenting the request from the user to perform the blocked online action to the administrator network access device and determining if the administrator accepts the request from the user to perform the blocked online action; and
      if the administrator accepts the request from the user to perform the blocked online action, immediately updating administrator controls used to filter the user's online actions to allow the blocked online action, and immediately transmitting the acceptance of the request automatically and without any further user input to the user network access device.

70. The system of claim 69, wherein the administrator control component also allows the user to perform the blocked online action.

* * * * *